United States Patent
Lefkow et al.

(10) Patent No.: US 11,361,011 B1
(45) Date of Patent: Jun. 14, 2022

(54) SENSOR-RELATED IMPROVEMENTS TO AUTOMATIC REPLENISHMENT DEVICES

(71) Applicant: Amazon Technologies, Inc., Seattle, WA (US)

(72) Inventors: Dave Jonathan Lefkow, Bellevue, WA (US); Jon Appleby, Redwood City, CA (US); David Charles Buuck, Prunedale, CA (US); Charles Robert Watson, Santa Clara, CA (US); Amirali Virani, Bellevue, WA (US); Hannah McClellan Richards, Boise, ID (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 15/963,761

(22) Filed: Apr. 26, 2018

(51) Int. Cl.
*G06F 16/33* (2019.01)
*G06Q 30/06* (2012.01)
(Continued)

(52) U.S. Cl.
CPC ........ *G06F 16/335* (2019.01); *G06F 16/9535* (2019.01); *G06Q 30/0631* (2013.01); *G06Q 10/087* (2013.01); *G06Q 30/0633* (2013.01)

(58) Field of Classification Search
CPC .. G06F 16/335; G06F 16/9535; G06F 3/1229; G06Q 30/0631; G06Q 10/087;
(Continued)

(56) References Cited

U.S. PATENT DOCUMENTS 5,168,445 A 12/1992 Kawashima et al.
5,235,509 A 8/1993 Mueller et al.
(Continued)

FOREIGN PATENT DOCUMENTS

| WO | 2015/162421 A1 | 10/2015 |
| WO | 2016149674 | 9/2016 |
| WO | 2017118845 | 7/2017 |

OTHER PUBLICATIONS

López, Monitoring Pest Insect Traps by Means of Low-Power Image Sensor Technologies, Nov. 13, 2012, Sensor (Basel, Switzerland), 12(11), 15801-15819. (Year: 2012) (Year: 2012).*
(Continued)

*Primary Examiner* — Sangeeta Bahl
*Assistant Examiner* — Aaron N Tutor
(74) *Attorney, Agent, or Firm* — Kilpatrick Townsend & Stockton LLP

(57) ABSTRACT

The disclosed techniques relate to improving sensor data collection/reporting at an automatic replenishment device (ARD). For example, sensor data associated with the item stored at an ARD may be collected. The ARD can calculate a change in the amount of the item stored by the ARD from the sensor data. If the change is over a reporting threshold, the sensor data (or the amount of change) may be transmitted to a back-end system. Reporting may not occur if additional sensor data (e.g., accelerometer data and/or images captured at the ARD) is not commensurate with a user interaction. If the difference is under the reporting threshold or unlikely due to user interaction, the ARD may refrain from transmitting the sensor data. These techniques conserves power at the ARD, relieves the back-end system from needless processing, and enables more accurate indications of the amount of the item stored by the ARD.

20 Claims, 11 Drawing Sheets

(51) Int. Cl.
    *G06F 16/95*     (2019.01)
    *G06Q 10/08*     (2012.01)
    *G06F 16/335*    (2019.01)
    *G06F 16/9535*   (2019.01)

(58) Field of Classification Search
    CPC .............. G06Q 30/0633; G06Q 10/20; G06Q 30/0635; G06Q 30/0637
    See application file for complete search history.

(56) References Cited

U.S. PATENT DOCUMENTS

| | | | |
|---|---|---|---|
| 6,204,763 | B1 | 3/2001 | Sone |
| 6,799,085 | B1 | 9/2004 | Crisp, III |
| 7,542,866 | B1 | 6/2009 | Lovegren et al. |
| 8,005,761 | B1 | 8/2011 | Braumoeller et al. |
| 8,260,672 | B2 | 9/2012 | Weel et al. |
| 8,718,620 | B2 | 5/2014 | Rosenblatt |
| 9,267,834 | B2 | 2/2016 | Chowdhary et al. |
| 9,619,831 | B1 | 4/2017 | Kumar et al. |
| 10,360,617 | B2 | 7/2019 | High et al. |
| 10,402,779 | B2* | 9/2019 | Mai ................... G06Q 30/0633 |
| 10,438,276 | B2 | 10/2019 | Godsey et al. |
| 10,445,672 | B2 | 10/2019 | Renfroe |
| 10,445,819 | B2 | 10/2019 | Renfroe |
| 10,474,987 | B2 | 11/2019 | Corona et al. |
| 2006/0206373 | A1 | 9/2006 | Blair et al. |
| 2007/0162326 | A1 | 7/2007 | Weel et al. |
| 2008/0113614 | A1 | 5/2008 | Rosenblatt |
| 2010/0076903 | A1 | 3/2010 | Klingenberg et al. |
| 2011/0153466 | A1 | 6/2011 | Harish et al. |
| 2012/0038456 | A1 | 2/2012 | Pikkarainen et al. |
| 2013/0038455 | A1 | 2/2013 | Chowdhary et al. |
| 2013/0231877 | A1 | 9/2013 | Weber et al. |
| 2013/0300595 | A1 | 11/2013 | Hemmendorff |
| 2014/0095479 | A1 | 4/2014 | Chang et al. |
| 2014/0203040 | A1 | 7/2014 | Clark et al. |
| 2015/0142621 | A1 | 5/2015 | Gray et al. |
| 2015/0178654 | A1 | 6/2015 | Glasgow et al. |
| 2015/0186836 | A1 | 7/2015 | Chouhan et al. |
| 2015/0278912 | A1 | 10/2015 | Melcher et al. |
| 2015/0302510 | A1 | 10/2015 | Godsey et al. |
| 2015/0329260 | A1 | 11/2015 | Singh |
| 2016/0019780 | A1 | 1/2016 | Gettings et al. |
| 2016/0040580 | A1 | 2/2016 | Khaled et al. |
| 2016/0132821 | A1 | 5/2016 | Glasgow et al. |
| 2016/0134930 | A1 | 5/2016 | Swafford |
| 2016/0180239 | A1* | 6/2016 | Frankel .............. G06K 9/00288 706/12 |
| 2016/0203431 | A1 | 7/2016 | Renfroe |
| 2016/0229678 | A1 | 8/2016 | Difatta et al. |
| 2016/0314514 | A1 | 10/2016 | High et al. |
| 2017/0070523 | A1* | 3/2017 | Bailey ................. H04L 63/0861 |
| 2017/0201057 | A1 | 7/2017 | Ahlawat et al. |
| 2017/0300984 | A1 | 10/2017 | Hurwich |
| 2018/0012158 | A1 | 1/2018 | Cholewinski et al. |
| 2018/0053140 | A1* | 2/2018 | Baca .................... G06Q 10/087 |
| 2018/0164143 | A1* | 6/2018 | Gurumohan ........ G01F 23/2962 |
| 2018/0260779 | A1 | 9/2018 | Singh et al. |
| 2018/0308514 | A1 | 10/2018 | Li et al. |
| 2019/0108483 | A1* | 4/2019 | Tineo ................... G07G 1/0072 |
| 2020/0105409 | A1 | 4/2020 | Kochar et al. |

OTHER PUBLICATIONS

"Amazon Dash Replacement for Developers", Youtube, Available Online at: https://www.youtube.com/watch?v=WS42WcuSyVU, Jan. 30, 2017, 4 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

PCT/US2019/022215 , "International Search Report and Written Opinion", dated Apr. 29, 2019, 11 pages.

U.S. Appl. No. 15/918,205, U.S. Patent Application, titled "Managing Shipments Based on Data From a Sensor-Based Automatic Replenishment Device," filed Mar. 12, 2018.

U.S. Appl. No. 15/926,779, U.S. Patent Application, titled "Product Specific Correction for a Sensor-Based Device," filed Mar. 20, 2018.

U.S. Appl. No. 15/927,324, U.S. Patent Application, titled "Managing Electronic Requests Associated With Items Stored by Automatic Replenishment Devices," filed Mar. 21, 2018.

U.S. Appl. No. 15/927,946, U.S. Patent Application, titled "Automatic Replenishment of Items Utilizing a Sensorbased Device," filed Mar. 21, 2018.

U.S. Appl. No. 15/927,990, U.S. Patent Application, titled "Order Quantity and Product Recommendations Based on Sensor Data," filed Mar. 21, 2018.

U.S. Appl. No. 15/927,998, U.S. Patent Application, titled "Predictive Consolidation System Based on Sensor Data," filed Mar. 21, 2018.

U.S. Appl. No. 15/928,370, U.S. Patent Application, titled "Product and Lid Identification for Sensor-Based Device," filed Mar. 22, 2018.

U.S. Appl. No. 15/928,409, U.S. Patent Application, titled "LED Enhanced Product and Lid Identification for Sensorbased Device," filed Mar. 22, 2018.

U.S. Appl. No. 15/934,780, U.S. Patent Application, titled "Test-Enabled Measurements for a Sensor-Based Device," filed Mar. 23, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

"Amazon Dash Replenishment", XP054979477, Available online at URL:https://www.youtube.com/watch?v=vTYcWG 6BIDY, Jan. 19, 2016, 3 pages.

"Amazon Dash Replenishment for Developers", XP054979476, Available online at URL:https://www.youtube.com/watch?v=WS42WcuSyVU, Jan. 30, 2017, 5 pages.

"Dash Replenishment Service CX Guidelines", Dash Replenishment Service, XP055598411, Available online at URL:https://web.archive.org/web/2017120801 2109/https://developer.amazon.com/docs/das h/customer-experience-guidelines.html, Dec. 8, 2017, 9 pages.

"Dash Replenishment Service Glossary", Dash Replenishment Service, XP055598456, Available online at: URL:https://web.archive.org/web/2017120804 1422/https://developer.amazon.com/docs/das h/glossary.html, Dec. 8, 2017, 6 pages.

"Frequently Asked Questions", Dash Replenishment Service, XP055598417, Available online at URL:https://web.archive.org/web/2017120801 2934/https://developer.amazon.com/docs/das h/faqs.html, Dec. 8, 2017, 5 pages.

"GetOrderinfo Endpoint", Dash Replenishment Service, XP055598458, Available online at URL:https://web.archive.org/web/2017120804 1609/https://developer.amazon.com/docs/das h/getorderinfo-endpoint.html, Dec. 8, 2017, 6 pages.

"Notification Messages (DRS)", Dash Replenishment Service, XP055598457, Available online at URL:https://web.archive.org/web/2017120804 1525/https://developer.amazon.Gom/docs/das h/notification-messages.html, Dec. 8, 2017, 14 pages.

"Slotstatus Endpoint", Dash Replenishment Service, XP055598461, Available online at URL:https://web.archive.org/web/20171208041548/https://developer.amazon.com/docs/das h/slotstatus-endpoint.html, Dec. 8, 2017, 7 pages.

U.S. Appl. No. 15/696,040, U.S. Patent Application, titled "Sensor Data-Based Reordering of Items," filed Sep. 5, 2017.

Morton, "Smart Houses you can Live with: Technology Comes Home for Calgarians", Available Online at: https://dialog.proquest.com/professional/docview/245247947?accountid=131444, Jan. 8, 2005, 4 pages.

(56) References Cited

OTHER PUBLICATIONS

Kareem, et al., "Smart Inventory Control System Based on Wireless Sensor Network", International Journal of Engineering Research and Applications, vol. 7, No. 8, Available online at: https://www.researchgate.net/publication/319880991_Smart_Inventory_Control_System_Based_on_Wireless_Sensor_Network, Aug. 2017, 8 pages.

* cited by examiner

US 11,361,011 B1

SENSOR-RELATED IMPROVEMENTS TO AUTOMATIC REPLENISHMENT DEVICES

BACKGROUND

Automatic replenishment devices (ARDs) allow a customer to receive updates about an item by associating the device with the item and identifying a user device (e.g., a mobile phone number). Over time, an ARD may collect output data (e.g., sensor data) that indicates, among other things, how much of an item is being stored by the ARD. This output data may be provided to a back-end system of the online retailer and utilized to present notifications to the customer and/or to present information about how much of the item is currently stored by the ARD. Conventionally, as the customer depletes a supply of the item, or nearly depletes the supply, the customer may place a new order for more supply of the product by interacting with an online retailer to order more supply. Additionally, or alternatively, the online retailer may offer a subscription service that can deliver additional amounts on a periodic basis. In both cases, a back-end system of the online retailer allocates a delivery resource to the user and schedules delivery of the additional item amount.

However, conditions for which the output data is collected at the ARD and/or provided to the back-end system may lead to drawbacks. Generally, output data collection and transmission by the ARD may not be optimal and may waste power resources (e.g., battery life) and/or processing resources of the ARD and/or the back-end system. Additionally, sensors at the ARD may include some amount of error which may skew the data provided to the customer and result in one or more unintended consequences. Thus, improvements to conventional techniques for item replenishment and integration between an ARD and the back-end system are needed.

BRIEF DESCRIPTION OF THE DRAWINGS

Various embodiments in accordance with the present disclosure will be described with reference to the drawings, in which.

DETAILED DESCRIPTION

Figure 1:
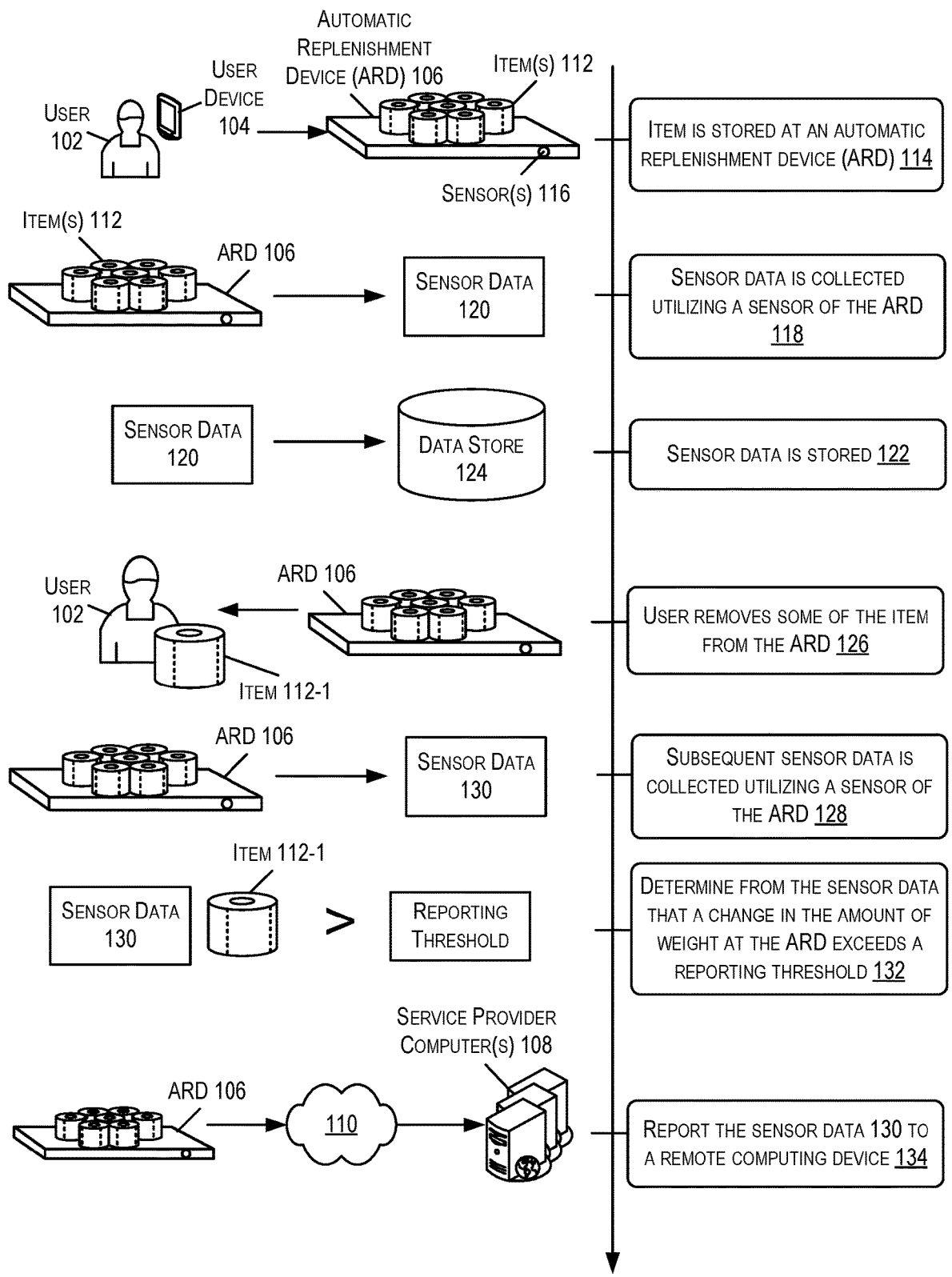
FIG. 1 illustrates a workflow for conserving power at the ARD by optimizing reporting of sensor data, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving power consumption at an automatic replenishment device (ARD) and integration between the ARD and a back-end system of an online retailer. An ARD may be a power-constrained device (e.g., a device operating on battery power). The ARD may be any suitable device on/in which an item may be placed and/or the ARD may be associated with a storage that includes an item where the ARD provides information (e.g., output data collected from one or more sensors) regarding the item included in storage. In at least one embodiment, various sensors (e.g., time-of-flight (ToF) sensors, load cells, weight sensors, accelerometers, image capture devices such as a camera, etc.) of an ARD may be utilized to collect sensor data related to an item stored by the ARD. As used herein, the phrase "items stored by the ARD" is intended to include situations in which the item is stored in a storage associated with the ARD, regardless of whether the item is stored in and/or on the ARD itself. The ARD sensor(s) may provide output data (hereinafter referred to as "sensor data") such as weight and/or distance measurements that may include some degree of error that can vary based at least in part on changes in temperature, ambient temperatures, movement produced at the ARD, electronics stabilizing, aging of the electronic component of the sensor, and the like. This may introduce an error into the measurements taken by the sensor equal to the amount of variation (also referred to as "sensor drift"). In some embodiments, the sensor data may be utilized by a back-end system to reorder a supply of the item on behalf of the user, to provide an estimation of the amount of the item stored by the ARD (or in a storage associated with the ARD), provide notifications, and the like.

Conventionally, an ARD may be configured to report all sensor data to a back-end system, without considering that the measurements contained in the sensor data may be the result of sensor drift. Reporting this type of sensor data wastes power resources at the ARD as the ARD may have to wake a Wi-Fi communication device in order to transmit sensor data to the back-end system. The back-end system may also waste processing resources needlessly processing the inaccurate sensor data. Additionally, the sensor drift (or other error) may cause inaccurate estimations of the current amount of the item stored by the ARD which can cause confusion for a customer and result in unintended consequences (e.g., inaccurate estimations regarding the amount of the item stored by the ARD, automated reorders that should not have occurred, inaccurate notifications, etc.).

In some embodiments, an item (e.g., a bag of flour) may be associated with the ARD during an association process conducted with a user device. The ARD could also be configured with a camera or other sensor that can recognize (e.g., via an image, a scan of a bar code, etc.) that a particular item is stored by the ARD. The ARD may further be configured to collect sensor data (e.g., distance measurements, weight measurements, etc.) via one or more sensors at the ARD (e.g., ToF sensor(s), load cell(s), etc.). The ARD may set an internal timer for a period of time (e.g., 1 hour, 2 hours, 30 minutes, 1 day, etc.) and may initiate sensor data collection upon expiration of the timer.

The ARD may store (or calculate) a reporting threshold (e.g., a value, a range, etc.). For example, a reporting threshold may correspond to a predetermined value which is hard coded in memory at the ARD or provided by the back-end system. Alternatively, the reporting threshold may be calculated (e.g., by the ARD and/or the back-end system) based at least in part on attributes of the item (e.g., weight, item type, etc.), the type of sensor(s) at the ARD, historical sensor drift data, or any suitable combination of the above.

The ARD may be configured to report sensor data to the back-end system upon determining a change, according to a reporting schedule, according to an internal timer (the same or different timer used to initiate sensor data collection), etc. The threshold value (e.g., a reporting threshold) may be utilized by the ARD to filter at least some sensor data from being reported. For example, if collected sensor data indicates a change in the amount of the item at the ARD that is equal to or exceeds the threshold value, the ARD may be configured to transmit the sensor data to a remote computing device (e.g., the back-end system). Conversely, if the collected sensor data indicates a change in the amount of the item at the ARD that is less than the threshold value, the ARD may forgo sending the sensor data. Thus, the threshold value may be used to determine when changes in the amount of the item may be due to sensor drift versus when the changes may indicate a user interaction with the item. Additionally, utilization of the threshold value may generally decrease the frequency at which the ARD transmits sensor data to the back-end system which saves processing resources at both the ARD and the back-end system. It should be appreciated that the reporting threshold (e.g., a value, a range, etc.) may be user in any suitable manner to filter at least some of the sensor data from being transmitting to the remote computing device.

In some embodiments, additional sensor data such as outputs provided by other sensors (e.g., an accelerometer, an image capture device, etc.) of the ARD may be utilized to determine whether to report sensor data to the back-end system. By way of example, accelerometer data and/or image(s) captured at the ARD may be collected at substantially the same time as other sensor data collection (e.g., from a weight sensor and/or a ToF sensor). In some examples, a change in the amount of the item may equal and/or exceed a threshold amount (e.g., a reporting amount). In such situations, the ARD may transmit the sensor data corresponding to the change in the amount of the item, as well as accelerometer data and/or the image(s) to the back-end system. The back-end system may be configured to determine whether the accelerometer data and/or image(s) indicate that the change in the amount of the item at the ARD was due to a user interaction. For example, the accelerometer data may indicate motion in the direction of a particular axis (e.g., the z-axis). In some embodiments, the back-end system may be configured to utilize the collected sensor data for any suitable purpose (e.g., determining an amount of the item at the ARD, notifying a user, generating an automated order, etc.) when the motion exceeds a motion threshold. Similarly, if an image indicates that a person was near the ARD when the sensor data indicates a change in the amount of the item, the back-end system may utilize such information to determine that the change was likely due to a user interaction at the ARD. In at least some embodiments, the ARD may be configured to determine whether the accelerometer data and/or the image(s) indicate to a user interaction. If such data indicates a user interaction, and the change in the amount of the item at the ARD exceed a reporting threshold, the ARD may be configured to transmit the sensor data. However, if the accelerometer data and/or image(s) (or other suitable sensor data) do not indicate a user interaction, the ARD may be configured to forgo transmission of the sensor data, in some cases, regardless of whether or not the change in the amount of the item was equal to or exceeded the reporting threshold.

As a specific example, a customer may place a 10 pound bag of flour on an ARD. The ARD may be configured to calculate a reporting threshold to be some percentage (e.g., 1%) of the item weight (e.g., 0.1 lb.). A sensor on the ARD (e.g., a load cell) may be configured to collect weight measurements of the item. As the ARD collects measurements, the measured weight can fluctuate given sensor error. These fluctuations may indicate changes that are less than the reporting threshold. Accordingly, the ARD may not report these relatively small fluctuations to the back-end system. This may conserve some amount of battery life of the ARD as these types of fluctuations would not cause the ARD to initiate and utilize a wireless connection to report to the back-end system. The customer may then remove half of a cup of flour (e.g., 0.125 lbs.) from the bag. The ARD may determine that the sensor data collected at a subsequent time indicates that some amount of the item (0.125 lbs.) that exceeds the reporting threshold (0.1 lbs.) has been removed from the ARD. Accordingly, the ARD may initiate a wireless connection and transmit the sensor data or a difference value corresponding to the change in weight from a previous measurement (e.g., −0.125 lbs.) to the back-end system. In some examples, the ARD may determine that accelerometer data and/or other sensor data (e.g., one or more images collected at the ARD) indicates a user interaction with the ARD. In some cases, the ARD may initiate the wireless connection and transmit the sensor data or a difference value only if a user interaction is indicated. Although in some cases, the accelerometer data and/or one or more images may not be utilized to make reporting decisions. The process described above may similarly apply to ARDs that store the item within a container of the ARD and utilize one or more ToF sensors, as well as ARDs that do not store the item but that are configured to take measurements of an item in storage that is associated with the ARD (e.g., the ARD may be a lid that may fit on any suitable container of particular dimensions and shape).

It may be the case that the customer incrementally removes smaller portions of the item. For example, a customer may remove a tablespoon (e.g., 0.015 lbs.) of flour at a time. The ARD may be configured to store sensor data over a time period. In some examples, if a change is sensed, the ARD may be configured to take one or more additional sensor readings within a relatively short period of time. Thus, the ARD could determine at time 1, that the weight of the item as decreased by 0.015 lbs., at time 2 (e.g., 10 seconds after time 1), the weight may have decreased by an additional 0.99 lbs., at time 3 (e.g., 10 second after time 2) the weight may have remained the same, at time 4 (e.g., 10 seconds after time 3). Upon sensing a change in weight, the ARD may be configured to collect a predetermined number of additional sensor readings. For example, upon sensing a change in weight, the ARD may set a timer (e.g., 10 seconds, 5 seconds, 30 seconds, etc.). Upon expiration of the timer, the ARD may collect additional sensor data. If the additional sensor data indicates an additional change in weight, the timer may be reset (to the same or a different value). This process may be repeated a predetermined number of times (e.g., 5 times). Additionally, or alternatively, the process may be repeated until the ARD determines that there has not been a change in weight (or a significant change in weight) from the current sensor reading with respect to the last sensor reading, for some predetermined period of time, etc. While the ARD is collecting such sensor data, the ARD may store past sensor data (e.g., weight measurements). Thus, the ARD can determine from the example given above, that a total of amount of weight change equals 1.005 lbs. which exceeds the reporting threshold. The individual sensor data collected at time 1 and time 2 may not have been reported because the corresponding weight changes did not exceed the reporting threshold. Nevertheless, the ARD may be configured to report the total weight change because the total weight change exceeds the reporting threshold. This technique may ensure that estimations of the amount of the item at the ARD are accurate even when small increments of the item are removed over time. Additionally, this technique may cause the change in weight to be reported close in time to when the change actually occurred rather than waiting until the next scheduled report (e.g., the time at which the current reporting timer expires).

In at least one embodiment, the ARD may be configured to tune the reporting threshold based at least in part on determining that the item has been removed from the ARD. For example, the item may be removed from the ARD. Weight and/or distance measurements may be collected at the ARD which may indicate a non-zero value. The ARD may be configured to determine an amount that the non-zero value may be attributable to sensor error and update the reporting threshold to a value that is substantially equal to the non-zero value. In some embodiments, the ARD may be configured to determine that accelerometer data and/or image(s) captured at the ARD may indicate that the non-zero value is not due to a user interaction (e.g., there is no, or relatively little, motion at the ARD and/or a person is not present in the image). In these cases, the ARD may utilize the accelerometer data and/or image(s) to determine that the non-zero value is likely due to sensor drift and/or error and tune the reporting threshold accordingly. Thus, sensor data indicating a change in the amount of the item may not be transmitted to the back-end system if it unlikely that the change was due to user interaction.

In at least one embodiment, the ARD may be configured to tune the reporting threshold based at least in part on historical sensor data. By way of example, the ARD may store sensor measurements (e.g., distance measurements, weight measurements, etc.) over time. In some examples, the ARD may store only sensor measurements that were determined to be less than the reporting threshold utilized at the time. The ARD may analyze the historical sensor data to determine a new reporting threshold (e.g., a highest sensor measurement that is less than the current reporting threshold). In some embodiments, the analysis may factor in ambient temperatures determined via a thermal sensor at the ARD. That is, the historical sensor data may be normalized based at least in part on the ambient temperature surrounding the ARD at the time each instance of sensor data was collected. Thus, the historical sensor data may be utilized to estimate an expected amount of sensor drift/noise. The reporting threshold may then be set to the estimated value in order to more accurately filter out subsequent sensor data that may be generated due to sensor drift/error. Additionally, or alternatively, the expected amount of sensor drift/noise may be utilized to adjust the calculated amount of the item at the ARD, providing a more accurate estimation of the amount of the item at the ARD.

In some embodiments, the ARD (as well as additional ARDs of the system) may be configured to report historical sensor data to a remote computing device (e.g., computers of a service provider). The historical sensor data may include previously-obtained sensor data. In some examples, the historical sensor data may include all previously-obtained sensor data within a given time period (e.g., the last 24 hours, the last 12 hours, sensor data collected on a same day a year ago, etc.) and/or the sensor data may include a subset of the previously-obtained sensor data. For example, the sensor data may include only sensor data that indicates measurements that were determined to be less than the reporting threshold utilized at the time. The ARD(s) may be configured to transmit this historical sensor data to the remote computing device according to a schedule, at predetermined time intervals, upon request, etc. The remote computing device can utilize the transmitted historical sensor data to tune the reporting threshold for a particular ARD/sensor. The historical sensor data provided by the ARD (and in some cases other ARDs) may be analyzed by the remote computing device utilizing any suitable technique (e.g., machine learning techniques, predictive analytic techniques, etc.). Through this analysis, the remote computing device may determine an expected amount of sensor drift and/or an expected amount of sensor error for a sensor that may be measuring amounts of the item stored at the ARD. Thus, the remote computing device may in some cases determine a reporting threshold for a particular item/ARD/sensor based on historical data from the particular ARD and/or historical data obtained from potentially many ARDs. Accordingly, the remote computing device can be used to provide a more accurate estimation of sensor drift/sensor error over time. Once determined, the estimated amount of sensor drift/sensor error may be utilized to set a reporting threshold value. The updated reporting threshold value may be communicated to the ARD via any suitable process.

In some embodiments, the accelerometer data and/or other suitable sensor data (e.g., image(s) captured at the ARD) may be utilized to determine that an object has potentially fallen on the ARD. By way of example, accelerometer data that indicates a sudden change in force (e.g., over a particular threshold value) along a particular axis (e.g., the z-axis) may indicate that an object has fallen on the ARD. Accordingly, the ARD may be configured to transmit data to the back-end system, which in turn may cause the back-end system to notify the user (e.g., via email, text message, website, or the like) associated with the ARD of the condition.

By utilizing the techniques discussed herein, power resources may be preserved at the ARD due to filtering out needless reports for sensor data that is potentially due to sensor drift. Processing resources at both the ARD and the back-end system may be alleviated from processing needless and/or inaccurate data as such data is filtered at the ARD. As a result, estimations of the amount of the item stored by the ARD (or in storage associated with the ARD) may be more accurate, which in turn may cause reordering, notifications, and/or item amount presentations to be more accurate. Increasing the accuracy of the sensor data reported may result in less wasted processing at the ARD and/or the back-end system and less confusion for the customer viewing the data.

FIG. 1 illustrates a workflow 100 for conserving power at the ARD by optimizing reporting of sensor data, in accordance with at least one embodiment. The workflow may include user 102, user device 104, automatic replenishment device 106, and service provider computer(s) 108. The service provider computer(s) 108, the ARD 106, and the user device 104 may be configured to communicate (via a wired or wireless connection) with one another via network(s) 110 (e.g., a local area network, a wide area network, a cellular network, the Internet, or the like) via any suitable communications protocol.

Prior to performance of the workflow 100, the user 102 may utilize any suitable means for obtaining an item(s) 112 (e.g., multiple units of bathroom tissue). For example, the user 102 may utilize the user device 104 to browse an electronic marketplace of an online retailer for bathroom tissue. The electronic marketplace may be hosted by the service provider computer(s) 108 and/or another suitable system. Utilizing interfaces provided by the electronic marketplace, the user 102 may purchase the item(s) 112 which may then be delivered to the user 102 utilizing any suitable shipping methods.

At 114, some portion of the item(s) 112 may be stored by the ARD 106. An example of the ARD 106 is provided in FIG. 5 in more detail. As depicted in FIG. 1, the ARD 106 may a mat of any shape, depth, or size, the ARD 106 may be any suitable device on which item(s) 112 may be placed. In embodiments, the ARD 106 may include one or more sensor(s) 116. The sensor(s) 116 may include a weight sensor (e.g., a load sensor, a strain gauge on a load cell, etc.) that is configured to determine/detect a weight/mass of item(s) 112 placed on the ARD 106. The sensor(s) 116 may further include an accelerometer and/or an image capture device. In accordance with at least one embodiment, sensor data (e.g., weight measurements, property measurements, etc.) may include raw data that was obtained by the sensor(s) 116 that represents a current weight/mass of the item(s) 112 that are situated on the ARD 106. In some embodiments, the weight measurements may indicate a current weight/mass of the item(s) 112 and/or item number/quantity data that indicates a number or quantity of the item(s) 112 situated on the ARD 106.

In some embodiments, the item(s) 112 may be associated with the ARD 106 utilizing an association process conducted with the user device 104 and/or the ARD 106. The association process may be performed upon placement of the item, as a result of user input, or at any suitable time. For example, the user 102 may operate the user device 106 to associate the item with the ARD 106 utilizing interfaces provided by the user device 106 and/or the service provider computer(s) 108 (e.g., via web site hosted by the service provider computer(s) 108). Additionally, or alternatively, the ARD 106 may be utilized to identify the item(s) 112 via input (e.g., provided via an input/output device of the ARD 106 such as a keypad, scanner, etc.) or the ARD 106 may sense (e.g., via an image capture device or other sensors of the ARD 106) the item(s) 112. The ARD 106 may transmit the input/sensor data to the service provider computer(s) 108, which in turn may associate the item(s) 112 with the ARD 106.

At 118, sensor data 120 may be collected utilizing one or more sensors of the sensor(s) 116 of the ARD 106. The ARD 106 may initiate sensor data collection according to a predetermined schedule (e.g., stored by the ARD 106 and/or provided by the service provider computer(s) 108. In some embodiments, the ARD 106 may be configured to utilize a timer that is set to a predetermined time (e.g., 30 minutes, 1 hour, 1 day, etc.). A default timer duration may be stored by the ARD 106 or provided and/or modified by the service provider computer(s) 108. The default timer duration may be based at least in part on the item stored by the ARD 106. For example, the ARD 106 may store a mapping that indicates that for item(s) 112 sensor data is to be collected every hour. Alternatively, the service provider computer(s) 108 may determine (e.g., from a mapping) the default timer duration and provide such data to the ARD 106. Generally, sensor data (e.g., sensor data 120) may be collected at any suitable time according to a predetermined schedule, at periodic time intervals, upon sensing user interaction with the item(s) 112 and/or the ARD 106 (e.g., as indicated by accelerometer data and/or image(s) collected at the ARD), upon user input entered at the ARD 106, upon instruction from the service provider computer(s) 108 and/or the user device 104, and/or at any suitable time.

At 122, sensor data 120 may be stored by the ARD 106 (e.g., in data store 124 of the ARD 106). The ARD 106 may be configured to store all sensor data collected by the sensor(s) 116 or the ARD 106 may store some portion of sensor data collected by the sensor(s) 116. For example, the ARD 106, due to storage capacity of the data store 124 may store a particular number of instances of sensor data (e.g., the last 12 instances of sensor data, the last 24, etc.). In some examples, the ARD 106 may store the sensor data 120 based at least in part on determining that a weight change indicated by the sensor data 120 is under a threshold value (e.g., a reporting threshold). The threshold value may be calculated by the ARD 106 as a percentage of the total initial weight of the item(s) 112 (e.g., 1%, 5%, 0.2%, etc.). The threshold value may be item specific. The threshold value may be calculated or identified to be approximately equal to one unit of the item(s) 112. By way of example, the threshold value (e.g., the reporting threshold) for the item(s) 112 may be calculated/identified as equal to the approximate weight of one roll of bathroom tissue. In some examples, the threshold value may be predetermined and stored by the ARD 106. Additionally, or alternatively, the threshold value may be provided by the service provider computer(s) 108 (e.g., as part of the association process discussed above, or at any suitable time).

At 126, the user may remove some of the item(s) 112 from the ARD 106. For example, the user may remove item 112-1 corresponding to a single roll of bathroom tissue. It should be appreciated that in other examples, the user could remove any suitable number of rolls and/or amount of the item(s) 112.

At 128, subsequent sensor data 130 may be collected by one or more of the sensor(s) 116 of the ARD 106. The subsequent sensor data 130 may indicate that a weight change (e.g., corresponding to the item 112-1) has occurred at the ARD 106. At 132, the ARD 106 may determine (e.g., based at least in part on a comparison between the weight change and the reporting threshold) that the change in the amount of weight at the ARD 106 exceeds the reporting threshold.

At 134, as a result of the determination at 132, the ARD 106 may transmit the sensor data 130 to the service provider computer(s) 108 via the network(s) 110. Although not depicted, if the weight change was determined to be less than the reporting threshold, the ARD 106 may store the sensor data 130, or discard sensor data, and/or forgo transmission of the sensor data 130. In some example, the ARD 106 may further utilize additional sensor data such as accelerometer data and/or image(s) captured at the ARD to determine whether or not the sensor data 130 was related to a user interaction and use this additional signal to determine whether to store the sensor data 130, discard sensor data, transmit the sensor data 130 and/or forgo transmission of the sensor data 130. By utilizing the reporting threshold (and in some cases the additional sensor data) as a filtering mechanism, the ARD 106 is configured to preserve battery power. That is, should sensor data be collected that was indicative of sensor drift/noise (e.g., fluctuations in weight measurements that are under the reporting threshold), the ARD 106 may not waste processing resources and battery power to initiate/utilize a communications connection (e.g., a wireless communication) with the service provider computer(s) 108. Forgoing transmission may also alleviate the service provider computer(s) 108 from processing sensor data that is inaccurate/misleading. Although not depicted in FIG. 1, many additional or alternative workflows are contemplated.

Figure 2:
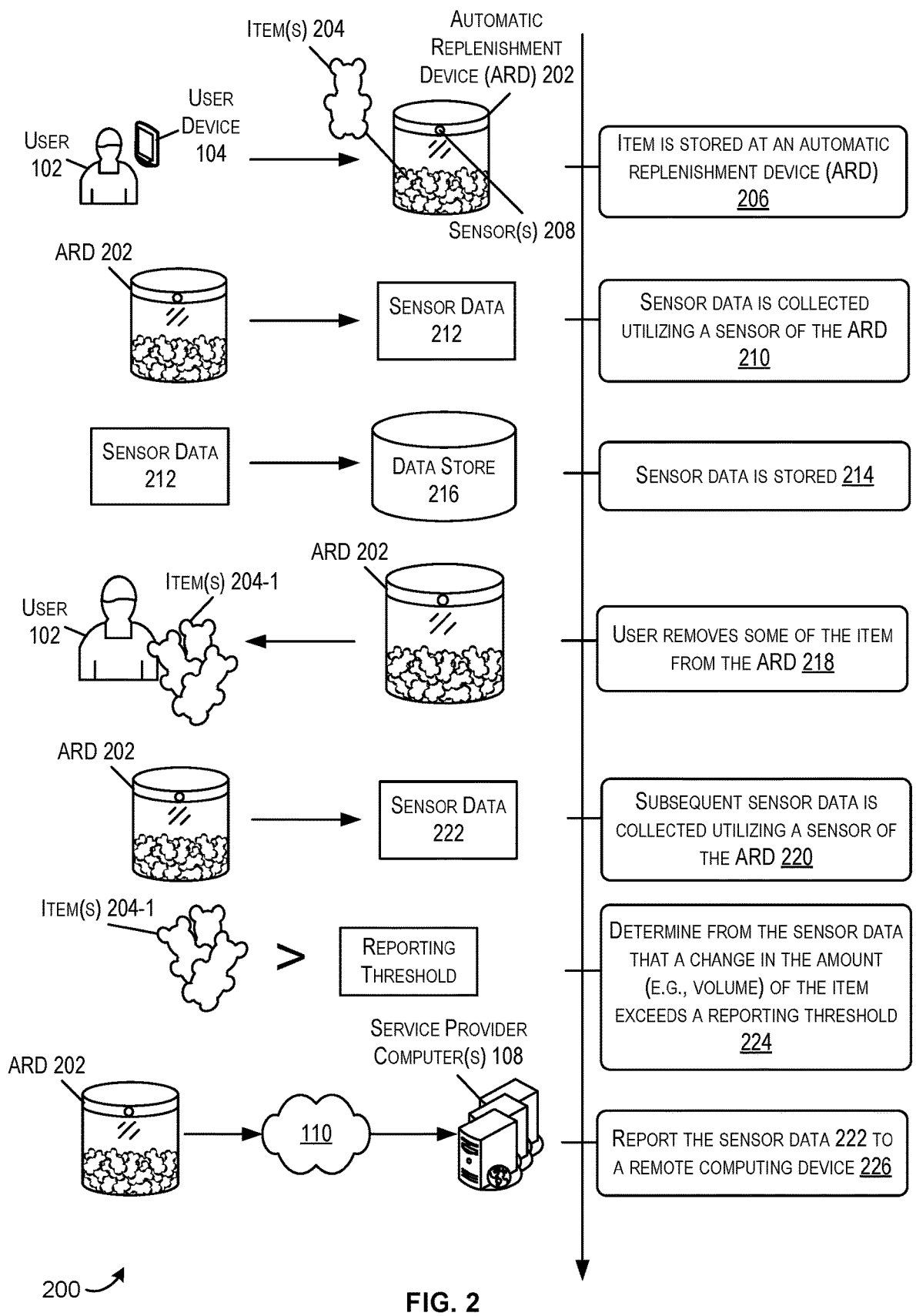
FIG. 2 illustrates an additional workflow for conserving power at the ARD by optimizing reporting of sensor data, in accordance with at least one embodiment.

FIG. 2 illustrates an additional workflow 200 for conserving power at an ARD by optimizing reporting of sensor data, in accordance with at least one embodiment. The workflow 200 may include automatic replenishment device (ARD) 202 and the user 102, the user device 104, and the service provider computer(s) 108 of FIG. 1. The service provider computer(s) 108, the ARD 202, and the user device 104 may be configured to communicate (via a wired or wireless connection) with one another via the network(s) 110 of FIG. 1 (e.g., a local area network, a wide area network, a cellular network, the Internet, or the like) via any suitable communications protocol.

Prior to performance of the workflow 200, the user 102 may utilize any suitable means for obtaining an item(s) 204 (e.g., gummi bears). Similar to the example provided in FIG. 1, the user 102 may utilize the user device 104 to browse an electronic marketplace of an online retailer for the item(s) 204. Utilizing interfaces provided by the electronic marketplace, the user 102 may purchase the item(s) 204 which may then be delivered to the user 102 utilizing any suitable shipping methods.

At 206, some portion of the item(s) 204 may be stored by the ARD 202. An example of the ARD 202 is provided in FIG. 4 in more detail. As depicted in FIG. 2, the ARD 202 may include a container and a lid. The lid may include one or more sensor(s) 208 (e.g., ToF sensors, accelerometer(s), image capture device(s)). Once placed within the ARD 202 as depicted in FIG. 2, the item(s) 204 may fill the ARD 202 to some level.

In some embodiments, the item(s) 204 may be associated with the ARD 202 utilizing an association process conducted with the user device 104 and/or the ARD 202. The association process may be performed upon placement of the item, as a result of user input, or at any suitable time. For example, the user 102 may operate the user device 104 to associate the item with the ARD 202 utilizing interfaces provided by the user device 104 and/or the service provider computer(s) 108 (e.g., via web site hosted by the service provider computer(s) 108). Additionally, or alternatively, the ARD 202 may be utilized to identify the item(s) 204 via input (e.g., provided via an input/output device of the ARD 202 such as a keypad, scanner, etc.) or the ARD 202 may sense (e.g., via an image capture device or other sensors of the ARD 202) the item(s) 204. The ARD 202 may transmit the input/sensor data to the service provider computer(s) 108 which in turn may associate the item(s) 204 with the ARD 202.

At 210, sensor data 212 (e.g., distance measurements, accelerometer data, one or more images, or any suitable combination of the above) may be collected utilizing the sensor(s) 208 of the ARD 202. The ARD 202 may initiate sensor data collection according to a predetermined schedule (e.g., stored by the ARD 202 and/or provided by the service provider computer(s) 108. In some embodiments, the ARD 202 may be configured to utilize a timer that is set to a predetermined time (e.g., 30 minutes, 1 hour, 1 day, etc.). A default timer duration may be stored by the ARD 202 or provided and/or modified by the service provider computer(s) 108. The default timer duration may be based at least in part on the item stored by the ARD 202. For example, the ARD 202 may store a mapping that indicates that sensor data related to the item(s) 204 is to be collected every hour. Alternatively, the service provider computer(s) 108 may determine (e.g., from a mapping) the default timer duration and provide such data to the ARD 202. Generally, sensor data (e.g., sensor data 212) may be collected at any suitable time according to a predetermined schedule, at periodic time intervals, upon sensing user interaction with the item(s) 204 and/or the ARD 202, upon user input entered at the ARD 202 and/or the user device 104, upon instruction from the service provider computer(s) 108 and/or the user device 104, and/or at any suitable time.

At 214, sensor data 212 may be stored by the ARD 202 (e.g., in data store 216 of the ARD 202). The ARD 202 may be configured to store all sensor data collected by the sensor(s) 208 or the ARD 202 may store some portion of sensor data collected by the sensor(s) 208. For example, the ARD 202, due to storage capacity of the data store 216 may store a particular number of instances of sensor data (e.g., the last 12 instances of sensor data, the last 24, etc.). In some examples, the ARD 202 may store the sensor data 212 based at least in part on determining that a weight change indicated by the sensor data 212 is under a threshold value (e.g., a reporting threshold). The threshold value may be calculated by the ARD 202 as a percentage of the total initial weight of the item(s) 112 (e.g., 1%, 5%, 0.2%, etc.). The threshold value may be item and/or ARD 202 specific. By way of example, the threshold value (e.g., the reporting threshold) for the item(s) 204 may be calculated/identified as equal to approximately 2% of the initial volume of the item(s) 204 or 2% of the volume of the container of the ARD 202. In some examples, the threshold value may be predetermined and stored by the ARD 202. Additionally, or alternatively, the threshold value may be provided by the service provider computer(s) 108 (e.g., as part of the association process discussed above, or at any suitable time).

At 218, the user may remove some of the item(s) 204 from the ARD 106. For example, the user may remove item(s) 204-1 corresponding to a particular amount of gummi bears. It should be appreciated that in other examples, the user could remove any suitable amount of the item(s) 112.

At 220, subsequent sensor data 222 may be collected utilizing sensor(s) 208 of the ARD 106. The subsequent sensor data 220 may indicate that volume change in the item(s) 204 (e.g., corresponding to the item(s) 204-1) has occurred at the ARD 202. At 224, the ARD 202 may determine (e.g., based at least in part on a comparison between the volume change indicated by the sensor data 222/sensor data 212 and the reporting threshold) that the change in the volume of the item(s) 204 exceeds the reporting threshold.

At 226, as a result of the determination at 224, the ARD 204 may transmit the sensor data 222 to the service provider computer(s) 108 via the network(s) 110. The ARD 204 may also store the sensor data 222 in data store 216 for future analysis. Although not depicted, if the volume change was determined to be less than the reporting threshold, the ARD 202 may store the sensor data 216, or discard sensor data, and/or forgo transmission of the sensor data 222. In some examples, the ARD 202 may further utilize additional sensor data such as accelerometer data and/or image(s) captured at the ARD to determine whether or not the sensor data 130 was related to a user interaction. This additional data may be utilized to determine whether to store the sensor data 130, discard the sensor data 130, transmit the sensor data 130 and/or forgo transmission of the sensor data 130. Thus, by utilizing the reporting threshold (and in some cases, the additional sensor data) as a filtering mechanism, the ARD 202 is configured to preserve battery power. That is, should sensor data be collected that was indicative of sensor drift/noise (e.g., fluctuations in distance measurements indicating changes in volume that are under the reporting threshold), the ARD 202 may not waste processing resources and battery power to initiate/utilize a communications connection (e.g., a wireless communication) with the service provider computer(s) 108. Forgoing transmission may also alleviate the service provider computer(s) 108 from processing sensor data that is inaccurate/misleading. Although not depicted in FIG. 2, many additional or alternative workflows are contemplated. Additionally, although ARD 202 is discussed as utilizing ToF sensors, it should be appreciated that the sensor(s) 208 may additionally, or alternatively, include one or more weight sensors configured to collect weight measurements of the item(s) 204. In these examples, the workflow 100 could be equally applied to the ARD 202.

Figure 3:
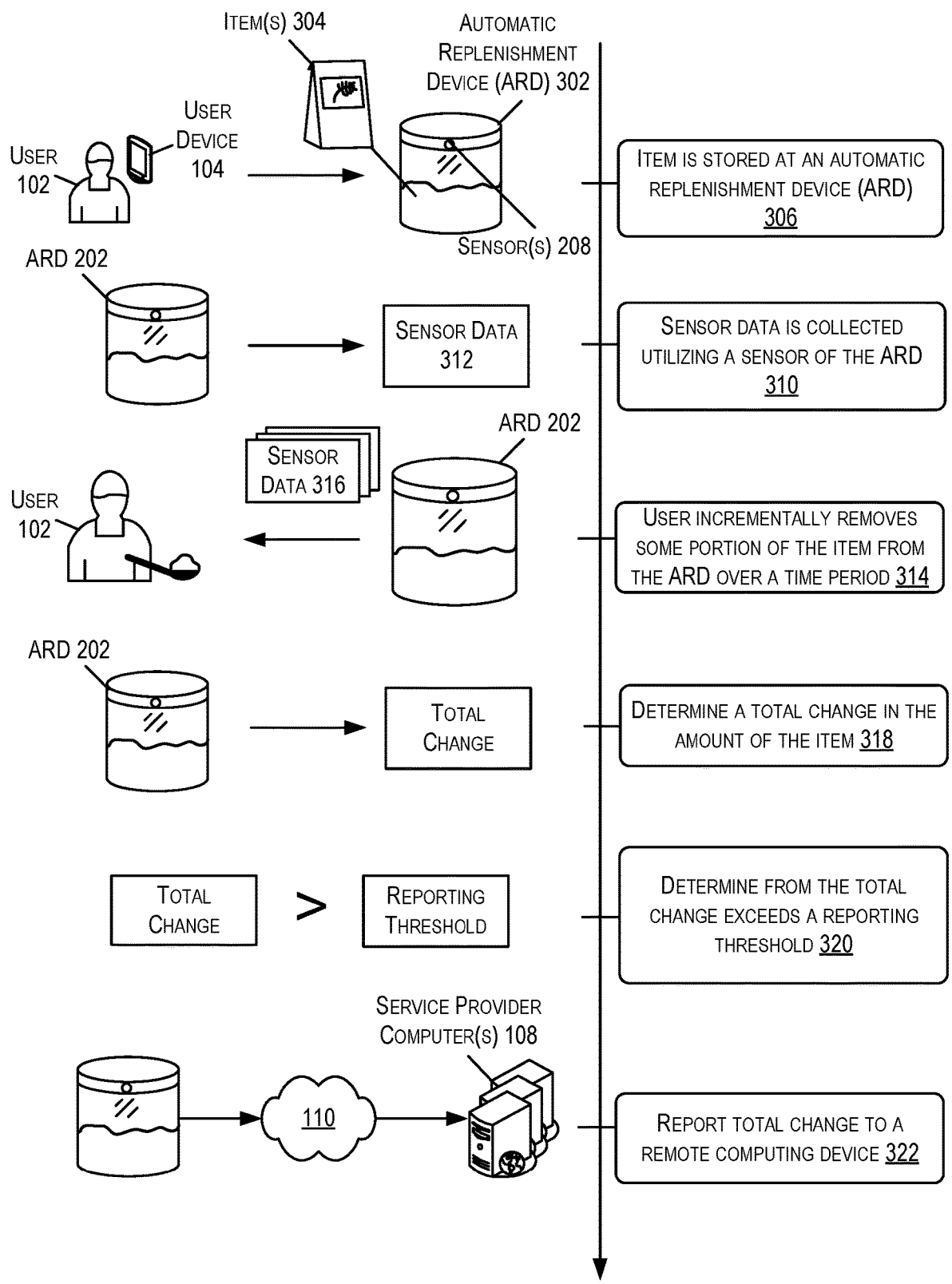
FIG. 3 illustrates an example workflow for an improved technique for reporting changes in the amount of an item stored at an ARD, in accordance with at least one embodiment.

FIG. 3 illustrates an example workflow 300 for an improved technique for reporting changes in the amount of an item stored at an ARD, in accordance with at least one embodiment. The workflow 200 may include automatic replenishment device (ARD) 302 and the user 102, the user device 104, and the service provider computer(s) 108 of FIG. 1. Although the example of FIG. 3 utilizes an ARD similar to the ARD 202 of FIG. 2 (e.g., ARDs configured with one or more ToF sensors), it should be appreciated that the workflow 300 may similarly be applied to ARDs that are similar to the ARD 106 of FIG. 1 (e.g., ARDs configured with one or more weight sensors). It should be appreciated that the ARD 202 may further be configured with one or more accelerometers and/or image capture devices. The service provider computer(s) 108, the ARD 302, and the user device 104 may be configured to communicate (via a wired or wireless connection) with one another via the network(s) 110 of FIG. 1 (e.g., a local area network, a wide area network, a cellular network, the Internet, or the like) via any suitable communications protocol.

Prior to performance of the workflow 300, the user 102 may utilize any suitable means for obtaining an item(s) 304 (e.g., a 10 lbs. bag of flour). Similar to the example provided in FIGS. 1 and 2, the user 102 may utilize the user device 104 to browse an electronic marketplace of an online retailer for the item(s) 304. Utilizing interfaces provided by the electronic marketplace, the user 102 may purchase the item(s) 304 which may then be delivered to the user 102 utilizing any suitable shipping methods.

At 306, some portion of the item(s) 304 may be stored by the ARD 302. As depicted in FIG. 3, the ARD 302 may include a container and a lid. The lid may include one or more time-of-flight (ToF) sensors (e.g., sensor(s) 308). Once placed within the ARD 302 as depicted in FIG. 3, the item(s) 304 may fill the ARD 302 to some level.

In some embodiments, the item(s) 304 may be associated with the ARD 302 utilizing an association process conducted with the user device 104 and/or the ARD 302. The association process may be performed upon placement of the item, as a result of user input, or at any suitable time. For example, the user 102 may operate the user device 104 to associate the item with the ARD 302 utilizing interfaces provided by the user device 104 and/or the service provider computer(s) 108 (e.g., via web site hosted by the service provider computer(s) 108). Additionally, or alternatively, the ARD 302 may be utilized to identify the item(s) 304 via input (e.g., provided via an input/output device of the ARD 302 such as a keypad, scanner, etc.) or the ARD 302 may sense (e.g., via an image capture device or other sensors of the ARD 302) the item(s) 304. The ARD 302 may transmit the input/sensor data to the service provider computer(s) 108 which in turn may associate the item(s) 204 with the ARD 302.

At 310, sensor data 312 may be collected utilizing the sensor(s) 308 of the ARD 302. As described above in connection with FIGS. 1 and 2, sensor data (e.g., sensor data 312) may be collected at any suitable time according to a predetermined schedule, at periodic time intervals, upon sensing user interaction with the item(s) 304 and/or the ARD 302, upon user input entered at the ARD 302 and/or the user device 104, upon instruction from the service provider computer(s) 108 and/or the user device 104, and/or at any suitable time.

At 314, the user 102 may incrementally remove various portions of the item from the ARD 302 over a time period. For example, the user 102 may remove approximately a half of a cup of flour at a time t1, t2, and t3 (the difference between t1 and t3 may equal, for example, 20 seconds). The ARD 302 may be configured to collect sensor data 316 (e.g., multiple instances of sensor data) over a larger time period. By way of example, the ARD 302 may collect a first instance of the sensor data 316 at a time after t1. Upon determining that the instance of sensor data indicates a change in volume (e.g., a decrease of in fill level corresponding to 0.52 cups), the ARD 302 may be configured to take one or more additional sensor readings within a relatively short period of time. Upon sensing a change in volume, the ARD 302 may be configured to collect a predetermined number of additional sensor readings. For example, upon sensing a change in volume (e.g., a decrease in fill level indicated by an increased distance measurement), the ARD may set a timer (e.g., 10 seconds, 5 seconds, 30 seconds). Upon expiration of the timer, the ARD may collect additional sensor data. If the additional sensor data indicates and additional change in volume, the timer may be reset (to the same or a different value). This process may be repeated a predetermined number of times (e.g., 5 times). Alternatively, the process may be repeated until the ARD 302 determines that there hasn't been a change in volume (or relatively little change in volume) from the last sensor reading, for some predetermined period of time, number of instances of collected sensor data, etc. While the ARD 302 is collecting sensor data 316, the ARD 302 may store the sensor data 312 at the ARD 302 (or at least a running total of the volume changes indicates by the sensor data 312).

At 318, the ARD 302 can determine a total change in the amount of the item(s) 304. For example, the ARD 302 could determine via several instances of sensor data 316 that the volume of the item initially decreased by 0.52 cups, then again by 0.54 cups, and then again by 0.49 cups. Thus, the ARD 302 can determine from the example given above, that a total of volume change equals 1.55 cups.

At 320, the ARD 302 may determine that the total change exceeds a reporting threshold. In response to the determination at 320, at 322 the ARD 302 may be configured to report (e.g., transmit) the total change and/or the most recent sensor data to a remote computing device (e.g., the service provider computer(s) 108). In some example, the ARD 106 may further utilize additional sensor data such as accelerometer data and/or image(s) captured at the ARD to determine whether or not the total change was related to a user interaction. This additional data may be utilized to determine whether to send the total change and/or the most recent sensor data to the remote computing device. Assuming a reporting threshold of 1 cup, individually each of the instances of sensor data 316 would not have breached the reporting threshold and therefore would not be transmitted. Nevertheless, the ARD 302 may be configured to report a total volume change when the total volume change (e.g., 1.55 cups) collected from multiple instances of sensor data (e.g., sensor data 316) exceeds the reporting threshold (e.g., 1 cup). This may, in some instances, be dependent on the ARD accelerometer data and/or images captured at the ARD indicate that a user interaction has taken place. This technique may ensure that estimations of the amount of the item (e.g., a fill level of the item) at the ARD 302 are more accurate even when relatively small increments of the item are removed over time. If the ARD 302 was unable to identify the total amount change as described in FIG. 3, then the service provider computer(s) 108 may store and/or present an inaccurate fill level of the ARD 302 at least until the ARD 302 collects a subsequent sensor reading according to a predetermined schedule and/or upon timer expiration.

As an example, consider the case in which the ARD 302 is configured to collect sensor data on an hourly basis. If the user incrementally removes some of the item(s) 304 between 10 and 15 seconds after the last sensor data collection, the service provider computer(s) 108 may incorrectly identify the ARD 304 as being filled to a higher level for approximately 59 minutes and 45 seconds (e.g., until the next sensor data collection is set to occur). By utilizing the technique described in workflow 300, the service provider computer(s) 108 may receive indication of the incremental removal closer to when the removal occurred. Accordingly, an estimated fill level calculated by the service provider computer(s) 108 may be updated and presented on the user device 104, enabling the user 102 to view a more accurate estimation of the current fill level of the ARD 302.

Figure 4:
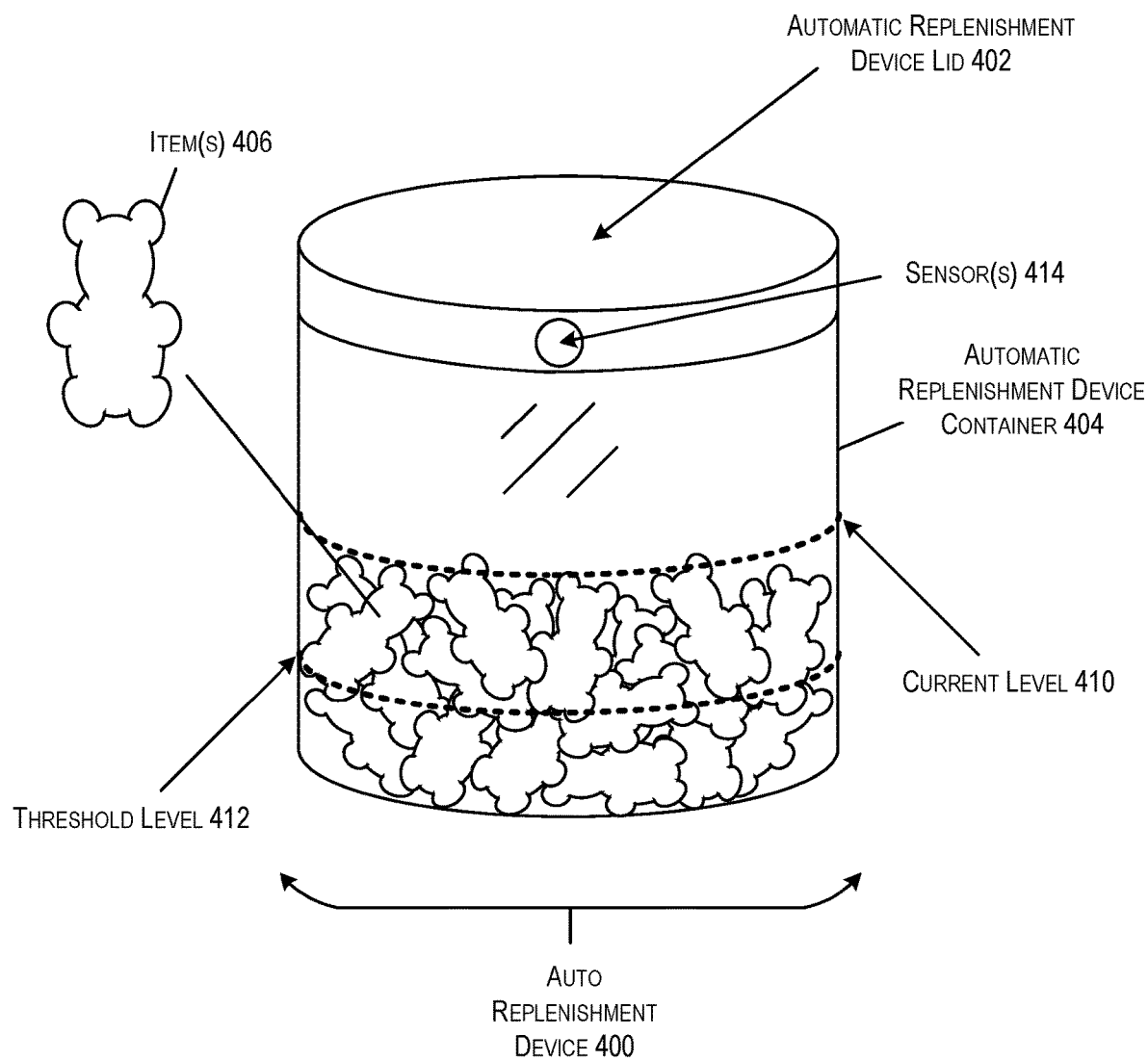
FIG. 4 illustrates an example ARD with some amount of the item placed within the ARD, in accordance with at least one embodiment.

FIG. 4 illustrates an example ARD with some amount of the item placed within the ARD, in accordance with at least one embodiment. FIG. 4 includes ARD 400 (e.g., an example of the ARD 104 of FIG. 1) that includes an ARD lid 402, and an ARD container 404. One or more item(s) 406 (e.g., gummi bears, coffee grounds, liquid detergent, flour, candy, pretzels, rice, etc.), may be stored within the ARD container 404. FIG. 4 also includes visual representations for a current level of the item(s) 406 at 410 and a threshold level 412. It should be noted that although the ARD 400 of FIG. 4 includes visual representations of a current level of item at 410 and a threshold level 412, these depictions are for clarification of aspects of the embodiments described herein. For example, a current level of item 410 may be determined by service provider computer(s) 108 of FIG. 1 based on sensor data obtained by sensor(s) 414 and maintained in a user profile that is generated and stored by the service provider computer(s) 108. As described herein, the threshold level 412 may be determined by the service provider computer(s) 108 based on the consumption data that is derived from the sensor data obtained by the sensor(s) 414 where the threshold level 412 is stored and associated with a user profile maintained by the service provider computer(s) 108.

It should be noted that the ARD 400 of FIG. 4 represents a container which may be of any shape, depth, or size, in which item(s) 406 are placed within. For example, the ARD 400 may be a 2.5 quart or 4.5 quart cylindrical container. In embodiments, the ARD 400 may include one or more sensor(s) 414 that may be configured to determine a distance of the item(s) 406 that are currently situated within the ARD container 404 of the ARD 400 (i.e., capture or obtain distance measurements between the one or more sensor(s) 414 and the item(s) 406). The sensor(s) 414 may include a time of flight sensor (e.g., a time of flight camera, a time of flight transmitter and receiver combination, etc.), that is configured to determine/detect a distance/amount of item(s) 406 placed in the ARD container 404 of the ARD 400 based at least in part on the time of flight for a signal to be emitted from the one or more sensor(s) 414 to a current level of the item(s) 406 (e.g., 410) or to a surface area of the item(s) 406. In accordance with at least one embodiment, the sensor data collected by the one or more sensor(s) 414 may include distance measurements identifying a distance between the item(s) 406 and one or more sensor(s) 414. The sensor data may include the raw data that was obtained by the sensor(s) 414 and/or the sensor data may include values that represent a conversion from the raw data to any suitable format and/or unit of measurement. In some embodiments, the sensor(s) 414 may further include one or more additional sensors (e.g., accelerometer(s), camera(s), thermometer(s) etc.).

The sensor data may indicate a current distance, amount, and/or volume of the item(s) 406 situated within the ARD container 404. For example, the sensor data may indicate a current distance (e.g., 140 mm, 5.5 inches, etc.) between the one or more sensor(s) 414 and the item(s) 406. The sensor data may indicate a current a current volume of the item(s) (e.g., 57.75 cubic inches, 39.23 cubic inches, etc.) and/or an item number or quantity that indicates a number or quantity of the item(s) 406 situated within the ARD container 404 of ARD 400. In some embodiments, the sensor data indicating a current distance/amount may be utilized (e.g., by the service provider computer(s) 108 of FIG. 1) to calculate a current volume of the item(s) 406 contained in the ARD container 404. The ARD 400 and sensor(s) 414 may be configured to utilize any suitable time of flight signal technology between the sensor(s) 414 and the item(s) 406. Although the ARD 400 of FIG. 4 includes the sensor(s) 414 within or on a surface of the ARD lid 402, the sensor(s) 414 may be placed on one or more interior surfaces of the ARD container 404. In at least one embodiment, the ARD lid 402 may be configured to be placed on any suitable container.

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 414 and item(s) 406 (e.g., current level of item(s) 406) utilizing a source/detector or transmitter/receiver. In embodiments, the service provider computers may be configured to determine a distance from the sensor(s) 414 and item(s) 406 (e.g., current level of item(s) 406) using the sensor data obtained by the sensor(s) 414.

For example, the elapsed time period between the transmission of a signal from a source to detection of the signal (e.g., from the sensor(s) 414), or at least a portion thereof, at a detector or receiver, along with the known speed of the signal (e.g., the speed of light) may be utilized to determine the distance between the source of the signal (e.g., sensor(s) 414) and the item(s) 406. The ARD 400 may be configured to transmit the sensor data obtained by sensor(s) 414 to a remote computing device separate from the ARD 400 (e.g., the service provider computer(s) 108 of FIG. 1, a cloud-based server/service, etc.). In some embodiments, the remote computing device may be configured to utilize the sensor data to calculate the distance between the sensor(s) 414 and/or the current level of item(s) 406 and correlate the distance to a volume, amount, and/or quantity of the item(s) 406 left in the ARD container 404. The sensor data may be used to determine the consumption data or consumption rate of item(s) 406 and in embodiments reorder the item(s) 406 upon the amount of the item being equal to or less than the threshold level 412.

Figure 5:
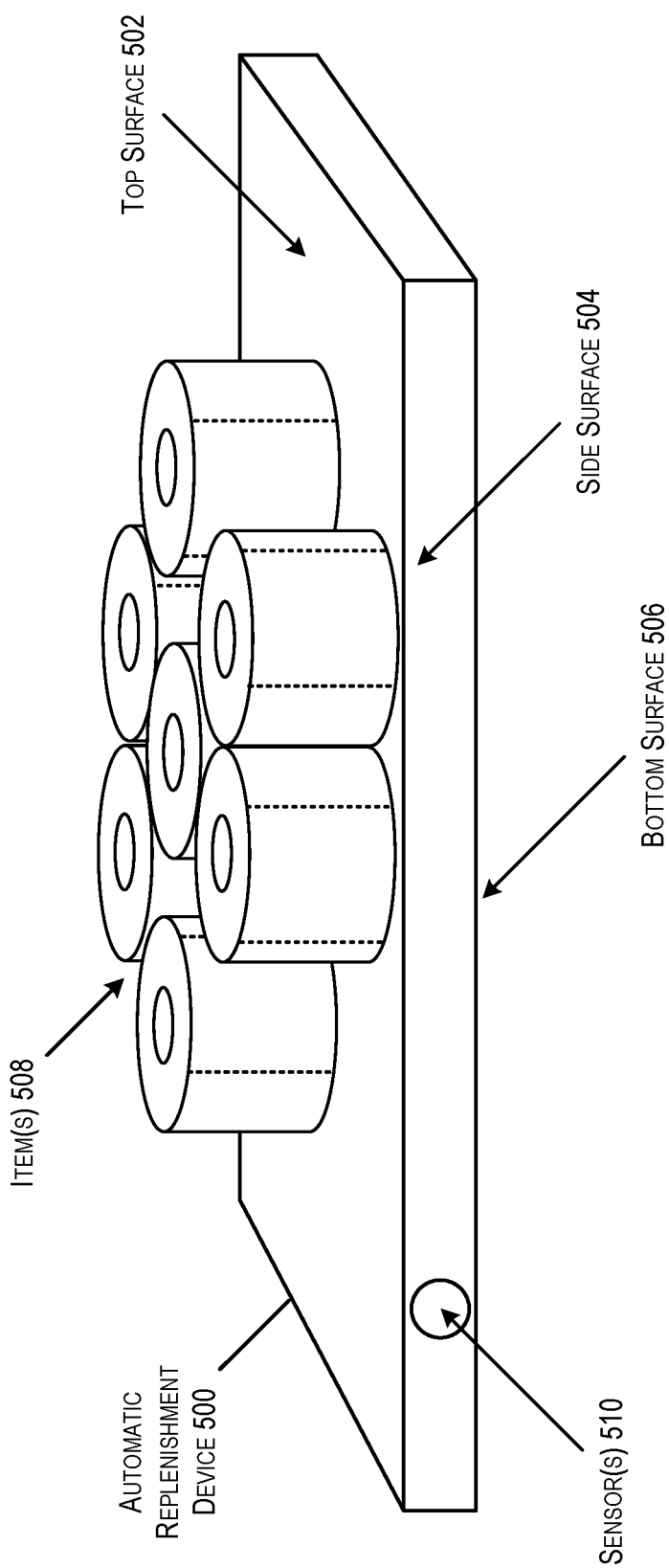
FIG. 5 illustrates another example ARD with items placed on the ARD, in accordance with at least one embodiment.

FIG. 5 illustrates an example ARD and items placed on the ARD, in accordance with at least one embodiment. FIG. 5 includes ARD 500 which may have a top surface 502, one or more side surfaces (e.g., side surface 504), and a bottom surface 506. One or more items, such as item(s) 508 may be placed on the top surface 502 of the ARD 500. The ARD 500 may be an example of the ARD 104 from FIG. 1. For the purposes of FIG. 5, although the item(s) 508 may be any type of product or item, the item(s) 508 depicted is bathroom paper. The bottom surface 506 may be in contact with a flat or substantially flat surface, such as a counter, table, or shelf. It should be noted that although the ARD 500 of FIG. 5 represents a mat which may be of any shape, depth, or size, the ARD 500 may be any suitable device on which item(s) 508 may be placed. In embodiments, the ARD 500 may include one or more sensor(s) 510. The sensor(s) 510 may be configured to determine a weight of the item(s) 508 that are currently placed on the top surface 502 of the ARD 500 (i.e., capture or obtain weight measurements of the item(s) 508). The sensor(s) 510 may include a weight sensor (e.g., a load sensor, a strain gauge on a load cell, etc.), that is configured to determine/detect a weight/mass of item(s) 508 placed on the top surface 502 of the ARD 500. In accordance with at least one embodiment, the weight of the item(s) 508 (e.g., sensor data, weight measurements, or property measurements) may include the raw data that was obtained by the sensor(s) 510 and ARD 500 that represents a current weight/mass of the item(s) 508 that are situated on the top surface 502 of ARD 500. The weight measurements may indicate a current weight/mass of the item(s) 508, item volume data that indicates a current volume of the item(s) 508, and/or item number/quantity data that indicates a number or quantity of the item(s) 508 situated on the ARD 500.

The ARD 500 may be configured to transmit, via any suitable network, weight measurements or other sensor data captured by sensor(s) 510 (e.g., weight measurements related to the item(s) 508, accelerometer data, one or more images, temperature data, etc.) to a service provider computer implementing the automatic replenishment engine discussed herein. In accordance with at least one embodiment, the weight measurements may be utilized by the service provider computers to determine consumption data or a rate of consumption by a user associated with ARD 500 of the item(s) 508. The sensor data (e.g., weight measurements, consumption data or rate of consumption) may be utilized to determine automatic replenishment decisions (e.g., when to replenish an item) on behalf of a user without the user having to take any action (e.g., revisiting an online retailer and/or electronic marketplace) or provide any indication regarding their consumption.

Figure 6:
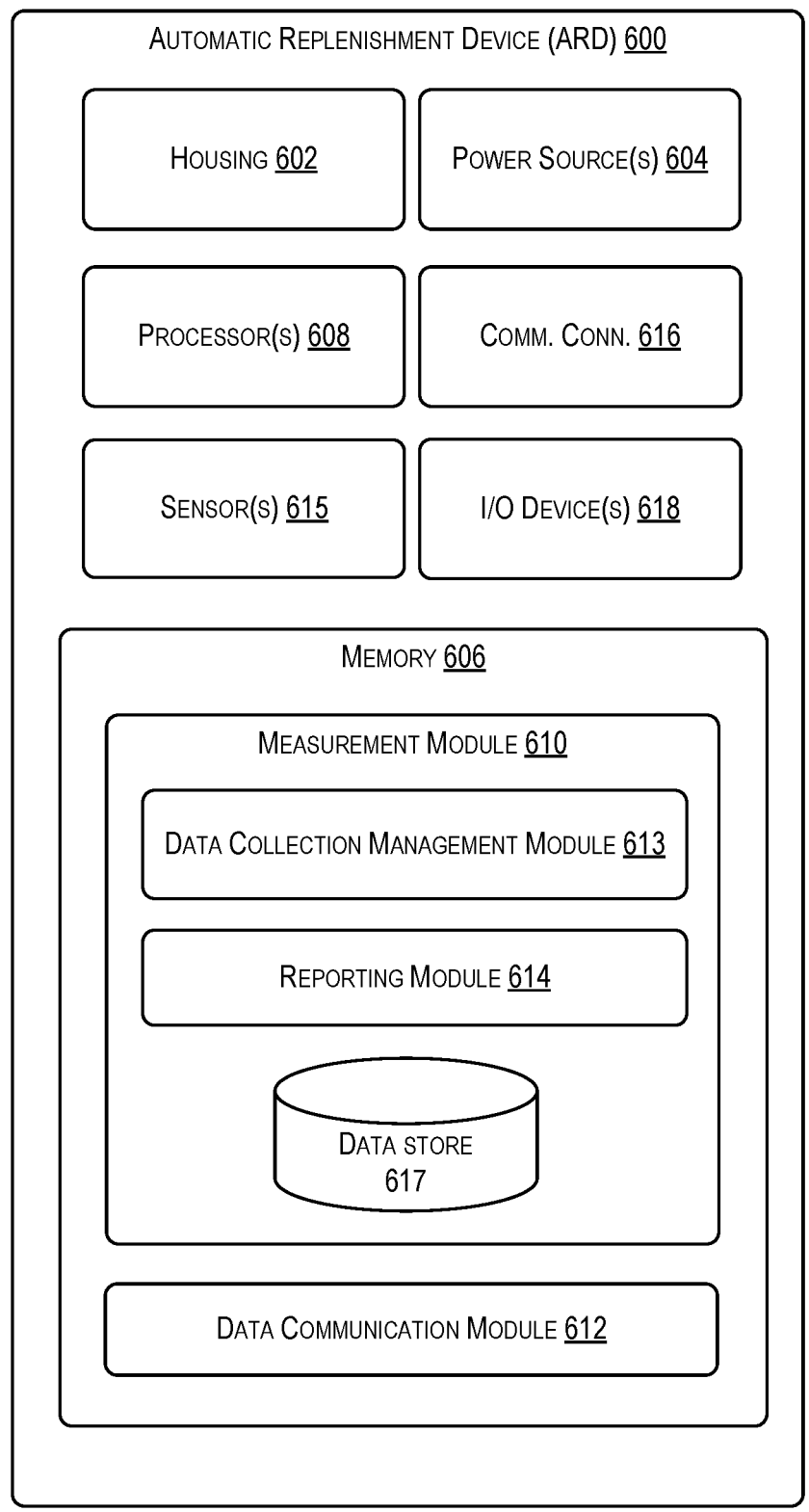
FIG. 6 illustrates a block diagram of components of an ARD, in accordance with at least one embodiment.

FIG. 6 illustrates a block diagram of components of an ARD, in accordance with at least one embodiment. The ARD 600 of FIG. 6 may be an example of any of the ARDs of FIG. 1-5. The ARD 600 (or a portion of the ARD 600 such as the ARD lid 402 of FIG. 4) may include a housing 602 that may include components of ARD 600 discussed further below. In embodiments, the housing 602 may be composed of any type of material (e.g., plastic, metal, etc.), and may serve to prevent the components of the ARD 600 from being damaged or interacting or otherwise contaminating the items placed within ARD 600.

The ARD 600 may include one or more power source(s) 604 that provide power to one or more components of the ARD 600. The power source(s) 604 may include a battery, which may include a one-time use battery or a rechargeable battery. However, the power source(s) 604 may rely on power from another source providing alternating current (AC) power and may be a power inverter. For example, the ARD may be powered via a power cord that is coupled to the ARD 600 and that is detachably connected to a power outlet, such as a wall outlet. In some embodiments, the ARD 600 may include a power level detector that is configured to determine and display a power level for the ARD 600 using alpha-numeric characters that indicate a current power level of a battery of the ARD 600 and power source(s) 604. The power level may be transmitted by the ARD 600 to a remote computing device (e.g., the service provider computer(s) 108 of FIG. 1-3), which may track the power level of the power source(s) 604 over time. In some embodiments, the ARD 600 and/or the remote computing device may provide a notification (e.g., to a user device not pictured) of the power level via any suitable means such an e-mail message, a text message, a mobile application, a website, etc.

The ARD 600 may include at least one memory (e.g., memory 606) and one or more processing units (e.g., processor(s) 608). The processor(s) 608 may be implemented as appropriate in hardware, computer-executable instructions, software, firmware, or combinations thereof. Computer-executable instruction, software or firmware implementations of the processor(s) 608 may include computer-executable or machine-executable instructions written in any suitable programming language to perform the various functions described.

The memory 606 may include more than one memory and may be distributed throughout the ARD 600. The memory 606 may store program instructions (e.g., related to the measurement module 610 and/or the data communication module 612) that are loadable and executable on the processor(s) 608, as well as data generated during the execution of these programs. Depending on the configuration and type of memory, the memory 606 may be volatile (such as random access memory (RAM)) and/or non-volatile (such as read-only memory (ROM), flash memory, or other memory). In some implementations, the memory 606 may include multiple different types of memory, such as static random access memory (SRAM), dynamic random access memory (DRAM), or ROM.

Turning to the contents of the memory 606 in more detail, the memory 606 may include one or more application programs, modules or services for implementing the features disclosed herein including measurement module 610 and/or the data communication module 612.

In some embodiments, the measurement module 610 may include one or more modules such as the data collection management module 613 and the reporting module 614. In some embodiments, the data collection management module 613 may be configured to obtain, store and/or maintain (in data store 617) one or more schedules and/or one or more default timer values. The schedule(s) and/or default timer value(s) may be utilized universally to obtain sensor data from sensor(s) 615 and/or the schedule(s) and/or default timer value(s) may be specific to the sensor(s) 615, the item, and/or the ARD (or type of ARD). In some embodiments, the data collection management module 613 may be configured to obtain sensor data from the sensor(s) 615 according to the schedule(s) and/or default timer(s). The sensor data from sensor(s) 615 to capture sensor data including distance measurements and/or weight data associated with the items placed on, or within, the ARD 600. A distance measurement may quantify a distance between the sensor(s) 615 and the item on/within the ARD 600. Weight data may indicate an amount of weight currently placed on/within the ARD 600. In some embodiments, the sensor data from sensor(s) 615 may include accelerometer data, image(s)/video, and/or temperature data. The memory 606 may be configured to store at least some of the collected sensor data. The data collection management module 613 may be configured to modify the schedule(s) and/or default timer(s) based at least in part on a temperature measurement (e.g., ambient temperature obtained by at least one of the sensor(s) 615, temperature at the sensor(s) 615, etc.).

In some embodiments the data collection management module 613 may be configured to receive sensor data from the sensor(s) 615 outside of the schedule(s) and/or timer expiration. For example, the data collection management module 613 may receive sensor data from sensor(s) as a result of random sensor fluctuation and/or a user interaction with the ARD and/or the item. If the data collection management module 613 determines that the sensor data received indicates a changes in the amount of the item at the ARD (in some cases, even if the change is due to random sensor fluctuations), the data collection management module 613 may modify the schedule(s) and/or timer(s) such that some number of additional sensor readings may be taken over a relatively short period of time. The data collection management module 613 may be configured to calculate (or maintain a running sum) of the changes in the amount of the item at the ARD over the course of the additional sensor readings. The number and/or frequency of the additional sensor readings may be determined by the data collection management module 613 (from stored data) and/or the number and/or frequency of the additional sensor readings may be instructed by the service provider computer(s) 108 and/or the user device 106 of the FIGS. 1-3. The data collection management module 613 may be configured to provide a running sum (or calculated total change) and/or most-recently obtained sensor data to the reporting module 614.

In some embodiments, the reporting module 614 may be configured to determine whether or not to report an instance of sensor data collected by the sensor(s) 615. In some embodiments, the reporting module 614 may base such determinations on weight and/or distance measurements of the sensor data alone (e.g., whether the weight/distance indicates a change in the amount of the item at the ARD over a reporting threshold). In some cases, reporting module 614 may base such determinations on weight and/or distance measurements of the sensor data as well as additional sensor data such as accelerometer data and/or image(s) captured at the ARD. The accelerometer data and/or image(s) may be utilized by the ARD to determine whether or not the weight/distance/amount change was likely due to a user interaction. In some embodiments, if such change was unlikely due to user interaction, the reporting module 614 may be configured to forgo transmission of any or all of the sensor data. The reporting module 614 may be configured to retrieve a stored reporting threshold (e.g., a threshold value) from memory 606 (e.g., data store 617). The reporting threshold may be a single value that is universally applied regardless of the particular item, ARD, type of ARD, storage capacity of the etc., of the reporting threshold may be specific to the item, ARD, type of ARD, storage capacity of the ARD, etc. The reporting module 614 may be configured to receive instructions from the data communication module 612 (e.g., instructions initiated from the user device 106 and/or the service provider computer(s) 108 of FIGS. 1-3) for modifying the reporting threshold.

In at least one embodiment, the reporting module 614 may be configured to tune the reporting threshold based at least in part on historical sensor data stored by the data collection management module 613. For example, the reporting module 614 may be configured to analyze the historical sensor data to identify sensor reports which were seemingly directed to random sensor fluctuations. Based on such data, the reporting module 614 may modify the reporting threshold to more accurately reflect an estimated fluctuation value. Thus, the reporting module 614 may tune the reporting threshold to more accurately filter out sensor drift.

As another example, the reporting module 614 may be configured to tune the reporting threshold based at least in part on determining that the item has been removed from the ARD. For example, the item may be removed from the ARD. Weight and/or distance measurements may be collected at the ARD which may indicate a non-zero value. The reporting module 614 may be configured to determine an amount of the non-zero value which may be attributable to sensor error and update the reporting threshold to an amount that is substantially equal to the non-zero value. In some embodiments, the reporting module 614 may be configured to determine that accelerometer data and/or image(s) captured at the ARD may indicate that the non-zero value is not due to a user interaction (e.g., there is no, or relatively little, motion at the ARD and/or a person is not present in the image). In these cases, the reporting module 614 may utilize the accelerometer data and/or image(s) to determine that the non-zero value is likely due to sensor drift and/or error and tune the reporting threshold accordingly. Thus, sensor data indicating a change in the amount of the item may not be transmitted to the back-end system if it unlikely that the change was due to user interaction.

In some embodiments, the reporting module 614 may be configured to report historical sensor data to a remote computing device (e.g., computers of a service provider). The historical sensor data may include previously-obtained sensor data (e.g., sensor data stored at data store 617). In some examples, the historical sensor data may include all previously-obtained sensor data within a given time period (e.g., the last 24 hours, the last 12 hours, sensor data collected on a same day a year ago, etc.) and/or the sensor data may include a subset of the previously-obtained sensor data. For example, the sensor data may include only sensor data that indicates measurements that were determined to be less than the reporting threshold utilized at the time. The reporting module 614 may be configured to transmit this historical sensor data to the remote computing device (e.g., service provider computer(s) 108 of FIGS. 1-3) according to a schedule, at predetermined time intervals, upon request, etc. The remote computing device can utilize the transmitted historical sensor data to tune the reporting threshold for a particular ARD/sensor. The historical sensor data provided by the reporting module 614 (and in some cases reporting modules of other ARDs) may be analyzed by the remote computing device utilizing any suitable technique (e.g., machine learning techniques, predictive analytic techniques, etc.). Through this analysis, the remote computing device may determine an expected amount of sensor drift and/or an expected amount of sensor error for a sensor that may be measuring amounts of the item stored at the ARD. The remote computing device may be configured to determine a reporting threshold for a particular item/ARD/sensor based at least in part on the historical data received from the reporting module 614 and/or historical data obtained from potentially many ARDs. Once determined, the estimated amount of sensor drift/sensor error may be utilized to set a reporting threshold value. The updated reporting threshold value may be communicated to the reporting module 614 from the remote computing device via the data communication module 612.

In some embodiments, the reporting module 614 may utilize accelerometer data and/or other suitable sensor data (e.g., image(s) captured at the ARD) to determine that an object has potentially fallen on the ARD. By way of example, accelerometer data that indicates a sudden change in force (e.g., over a particular threshold value) along a particular axis (e.g., the z-axis) may indicate that an object has fallen on the ARD. Accordingly, the ARD may be configured to transmit data to the back-end system, which in turn may cause the back-end system to notify the user (e.g., via email, text message, website, or the like) associated with the ARD of the condition. In some embodiments, the ARD may store pre-determined pattern information that indicates a pattern in accelerometer data that may be indicative of an object falling on the ARD. The reporting module 614 may, in some cases, compare the received accelerometer data to the pre-determined pattern information (e.g., stored at the data store 617) in order to determine that the accelerometer data is indicative of an object falling on/in the ARD.

It should be appreciated that the service provider computer(s) 108 may additionally, or alternatively analyze the historical sensor data provided to the service provider computer(s) 108 to identify an amount of sensor error. The sensor data reported to the service provider computer(s) 108 may be compared to user-provided information to determine some amount of error. Additionally, or alternatively, the service provider computer(s) 108 may utilize returns history (indicating that the sensor data triggered a reorder for the item that may have been in error), purchase history (indicating that the sensor data did not trigger a reorder for an item when the item should have been reordered), or any other suitable data to determine some amount of error. The service provider computer(s) 108 may utilize past known consumption rates (or historical changes in the amount of the item at the ARD) to identify a reporting threshold that is more likely to indicate that a change in the amount of the item is due to user interaction. For example, a particular user may, for a particular item, historically remove X amount of the item at a time. Accordingly, the service provider computer(s) 108 may instruct the reporting module 614 to modify the reporting threshold to a value that is slightly less than X so that changes under the user's typical behavior are filtered, while change at or above the user's typical behavior are reported. The service provider computer(s) 108 may utilize any of the analysis described above to determine a change to the reporting threshold which may then be communicated to the reporting module 614 via the data communication module 612.

In some embodiments, the data communication module 612 may include instructions that, when executed by the processor(s) 608, transmit and receive data via communication connection(s) 616. The communication connection(s) 616 may include suitable communication interfaces for communicating via Bluetooth (Bluetooth Low Energy (BLE)), WiFi, a cellular connection (e.g., 3G, 4G, LTE, etc.). The communication connection(s) 616 may be configured to transmit the data to a remote computing device (e.g., the service provider computer(s) 108 of FIGS. 1-3) or relay data to the remote computing device using a proxy device (e.g., a smartphone, a laptop, a desktop computer, or any suitable device capable of performing data transfers with the remote computing device). The communication connection(s) 616 any may utilize known or widely used communication protocols such as a wireless connection, a wired connection to a network, cellular network, short-range or near-field networks (e.g., Bluetooth), infrared signals, local area networks, wide area networks, the Internet, etc.

In at least one embodiment, the data communication module 612 may be configured to obtain sensor data from the measurement module 610 (the reporting module 614) and/or the memory 606. The data communication module 612 may be responsible for transmitting such sensor data to a remote computing device (e.g., the service provider computer(s) 108) according to any suitable communications protocol. The sensor data may be communicated in any manner, such as via Bluetooth (Bluetooth Low Energy (BLE) may also be considered when using the term "Bluetooth"), WiFi, a cellular connection (e.g., 3G, 4G, LTE, etc.), and so on.

In at least one embodiment, the data communication module 612 may be configured to receive data via the communication connection(s) 616. For example, the data communication module 612 may be configured to receive item information (e.g., an item identifier, unit weight, material consistency, item volume, item quantity, or any suitable attribute of an item) indicating a particular item is stored by the ARD 600. In some embodiments, the item information or other suitable information communicated to the data communication module 612 may include/indicate conversion algorithms for converting raw sensor data into a particular format and/or unit. In still further embodiments, the data communication module 612 may be configured to receive any suitable information for instructing the measurement module 610 in a manner of collecting sensor data utilizing sensor(s) 615. By way of example, an instruction may be received by the data communication module 612 and communicated to the measurement module 610 that indicates that sensor data is to be collected according to a schedule (provided as part of, or separate from, the instruction received by the data communication module 612), at a particular periodic rate, or the like. Generally, any suitable data that is to be transmitted or received by the ARD 600 may be processed by the data communication module 612 and provided to any other module and/or component of the ARD 600.

The ARD 600 may include sensor(s) 615 (e.g., one or more time of flight sensor, one or more load cells, camera sensors, thermal sensors for collecting ambient temperature measurements, scale sensors, infrared sensors, etc.) that are configured to obtain or capture sensor data of items placed on and/or within the ARD 600. The sensor(s) 615 may include signal transmitters and receivers that are configured to collect sensor data indicating an amount, quantity, weight measurement, and/or volume of an item stored by the ARD 600.

The sensor(s) 615 may be instructed and/or stimulated (e.g., by the measurement module 610) to obtain sensor data regarding the items stored by the ARD 600 at predetermined intervals, such as every day, every 12 hours, every 6 hours, every hour, every 15 minutes, and so on. In some embodiments, the sensor(s) 615 may determine/sense when item(s) are initially placed on or within the ARD 600, which may cause the sensor(s) 615 to obtain sensor data associated with the item(s). The sensor(s) 615 may also be instructed (e.g., by the measurement module 410) to obtain sensor data via instructions initiated at a remote computing device (e.g., the service provider computer(s) 108). The frequency of sensor data collection performed by the sensor(s) 615 may be adjusted based at least in part on receiving an updated schedule or instruction from the service provider computer(s) 108, the rate of consumption of the items, the manner in which the ARD 600 is being powered, an ambient temperature of an area near the ARD 600, etc. For instance, if the ARD 600 is being powered via a power cord and power outlet, the sensor data may be obtained more frequently (e.g., every hour, every 15 minutes, etc.). However, if the ARD 600 is being powered using a battery, the sensor data may be collected less frequently to conserve battery life (e.g., once per day).

The ARD 600 may also include input/output (I/O) device(s) 618 and/or ports, such as for enabling connection with a keyboard, a mouse, a pen, a voice input device, a touch input device, a display, speakers, a printer, or other I/O device. The I/O device(s) 618 may be in any suitable form (e.g., a button, a touchpad, etc.) to enable data to be provided to any suitable component of the ARD 600 and/or for presenting information (e.g., text, lights, sounds) at the ARD 600 (e.g., via speaker, a display, haptic feedback, etc.).

Figure 7:
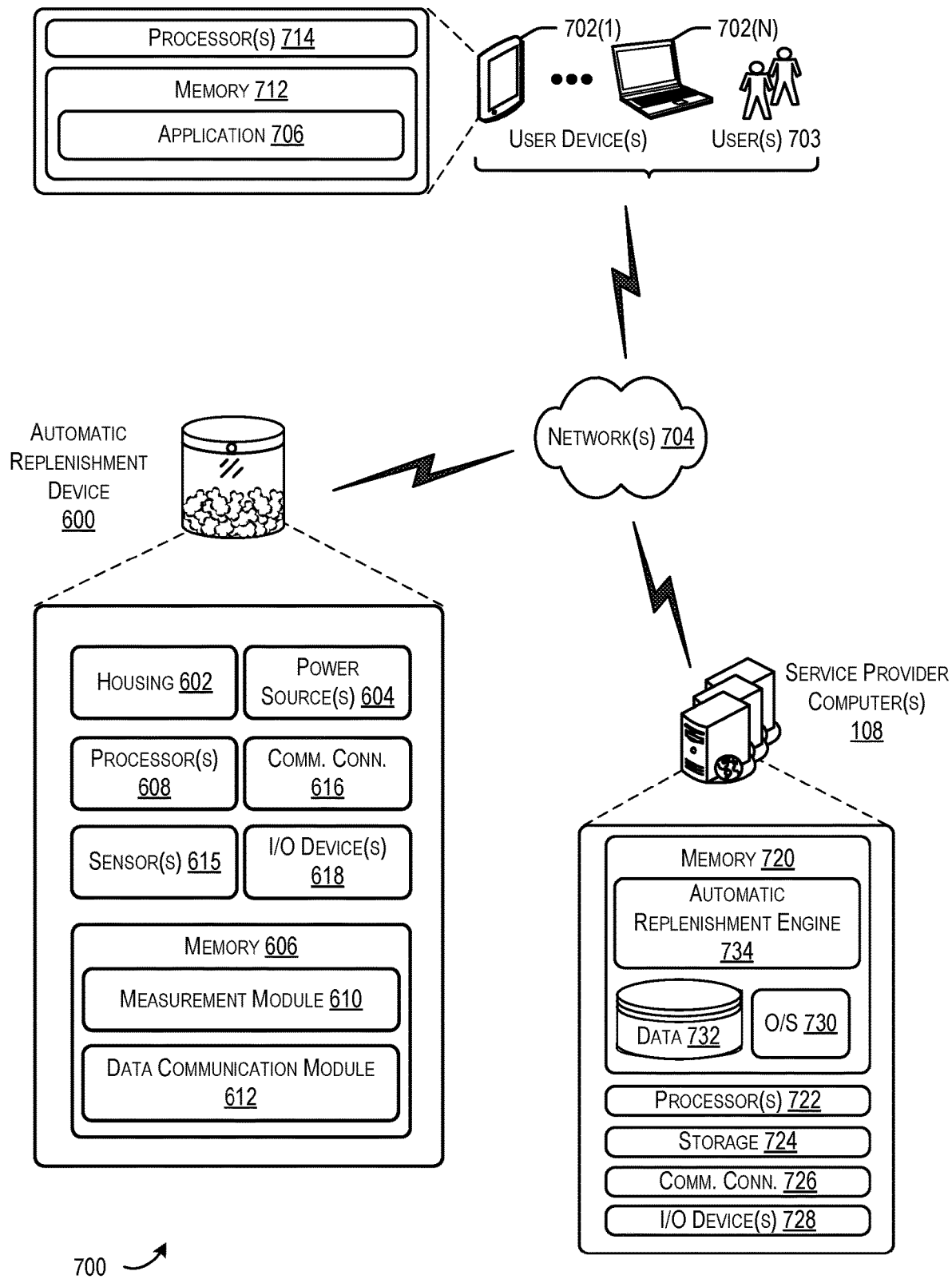
FIG. 7 illustrates an example architecture for determining replenishment decisions utilizing sensor data obtained at the ARD that includes one or more service provider computers, one or more user devices, and/or an ARD connected via one or more networks, in accordance with at least one embodiment.

FIG. 7 illustrates an example architecture 700 for determining replenishment decisions utilizing sensor data obtained at the ARD that includes one or more service provider computers 701 (e.g., the service provider computer(s) 108 of FIG. 1), one or more user devices 702, and/or an ARD (e.g., ARD 600) connected via one or more networks 704 (e.g., the network(s) 107 of FIG. 1), in accordance with at least one embodiment. In architecture 700, one or more users 703 (e.g., customers, users, consumers, etc.,) may utilize user computing devices 702(1)-(N) (collectively, user devices 702) to access application 706 (e.g., a browser application, a shopping application, etc.) or a user interface (UI) accessible through the application 708. In embodiments, the user devices 702 may include one or more components for enabling the user 703 to interact with the application 708.

The user devices 702 may include at least one memory 712 and one or more processing units or processor(s) 714. The memory 712 may store program instructions that are loadable and executable on the processor(s) 714, as well as data generated during the execution of these programs. Depending on the configuration and type of the user devices 702, the memory 712 may be volatile (such as random access memory (RAM)) and/or non-volatile (such as read-only memory (ROM), flash memory, etc.). The user devices 702 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 702. In some implementations, the memory 712 may include multiple different types of memory, such as static random access memory (SRAM), dynamic random access memory (DRAM), or ROM.

Turning to the contents of the memory 712 in more detail, the memory 712 may include an operating system and one or more application programs or services for implementing the features disclosed herein. Additionally, the memory 712 may include one or more modules for implementing the features described herein including the automatic replenishment engine 734.

The architecture 700 may also include one or more service provider computers 701 (e.g., an example of the service provider computer(s) 108 of FIG. 1) that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 701 may implement or be an example of the service provider computer(s) described herein. The one or more service provider computers 701 may also be operable to provide site hosting, media streaming services, computer application development, and/or implementation platforms, combinations of the foregoing, or the like to the one or more users 703 via user devices 702.

In some examples, the networks 704 may include any one or a combination of many different types of networks, such as cable networks, the Internet, wireless networks, cellular networks, and other private and/or public networks. While the illustrated examples represents the users 703 communicating with the service provider computers 701 over the networks 704, the described techniques may equally apply in instances where the users 703 interact with the one or more service provider computers 701 via the one or more user devices 702 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 701 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 701 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 701 may be in communication with the user devices 702 and/or the ARD 600 via the networks 704, or via other network connections. The one or more service provider computers 701 may include one or more servers, perhaps arranged in a cluster or as individual servers not associated with one another.

In one illustrative configuration, the one or more service provider computers 701 may include at least one memory 720 and one or more processing units or processor(s) 722. The processor(s) 722 may be implemented as appropriate in hardware, computer-executable instructions, firmware, or combination thereof. Computer-executable instruction or firmware implementations of the processor(s) 722 may include computer-executable or machine-executable instructions written in any suitable programming language to perform the various functions described when executed by a hardware computing device, such as a processor. The memory 720 may store program instructions that are loadable and executable on the processor(s) 722, as well as data generated during the execution of these programs. Depending on the configuration and type of the one or more service provider computers 701, the memory 720 may be volatile (such as RAM) and/or non-volatile (such as ROM, flash memory, etc.). The one or more service provider computers 701 or servers may also include additional storage 724, which may include removable storage and/or non-removable storage. The additional storage 724 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 720 may include multiple different types of memory, such as SRAM, DRAM, or ROM.

The memory 720, the additional storage 724, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 720 and the additional storage 724 are all examples of non-transitory computer storage media. Additional types of non-transitory computer storage media that may be present in the one or more service provider computers 701 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 701. Combinations of any of the above should also be included within the scope of non-transitory computer-readable media.

The one or more service provider computers 701 may also contain communication connection interface(s) 726 that allow the one or more service provider computers 701 to communicate with a data store, another computing device or server, user terminals, and/or other devices on the networks 704. The one or more service provider computers 701 may also include I/O device(s) 728, such as a keyboard, a mouse, a pen, a voice input device, a touch input device, a display, speakers, a printer, etc.

Turning to the contents of the memory 720 in more detail, the memory 720 may include an operating system 730, one or more data stores 732, and/or one or more application programs or services for implementing the features disclosed herein including the automatic replenishment engine 734 (e.g., an example of the automatic replenishment engine 118 of FIG. 1). In accordance with at least one embodiment, the automatic replenishment engine 734 may be configured to maintain a user profile associated with a user, determine a current fill level associated with an item situated on or within an ARD, determine a current weight of the item situated on or within an ARD, or the like. The automatic replenishment engine 734 will be discussed in further detail below with respect to FIG. 8.

The architecture 700 also includes the ARD 600 of FIG. 6. As disclosed herein, the ARD 600 may be configured, among other things, to utilize sensor(s) 615 to obtain sensor data associated with items stored by the ARD 600 (e.g., weight/distance measurements, accelerometer data, image(s) captured near the ARD, etc.).

Figure 8:
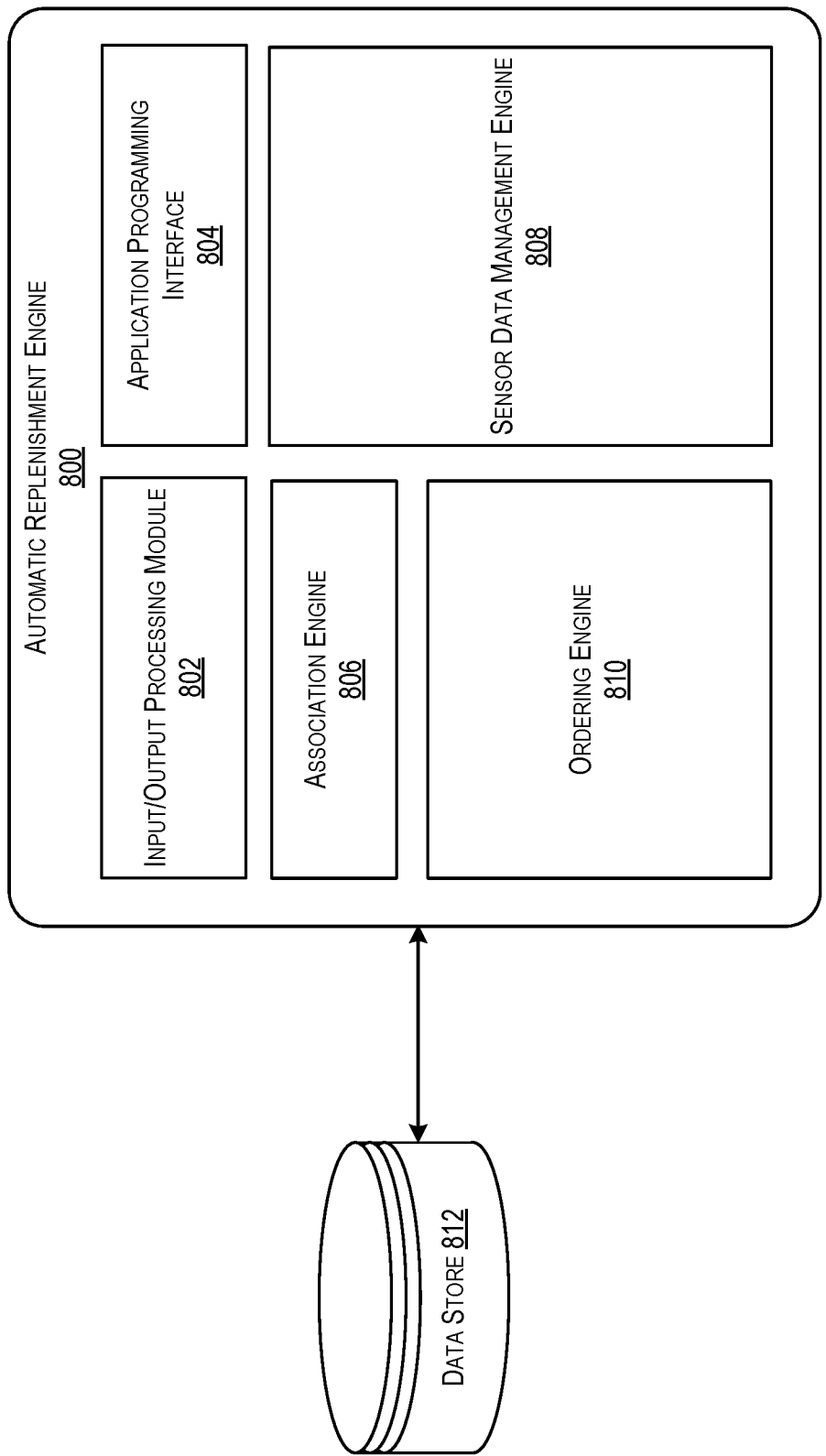
FIG. 8 illustrates a block diagram of components of an automatic replenishment engine, in accordance with at least one embodiment.

FIG. 8 illustrates a block diagram of components of an automatic replenishment engine 800, in accordance with at least one embodiment. Automatic replenishment engine 800 may be an example of the automatic replenishment engine 734 of FIG. 7. As shown, the example embodiment includes a number of modules including, but not limited to, an input/output processing module 802, an application programming interface 804, an association engine 806, a sensor data management engine 808, and an ordering engine 810. It should be appreciated that each module of FIG. 8 may be executed on a single computer, and or each component, or sets of components may be executed on separate computers. The modules/engines of FIG. 8 may be communicatively coupled to the data store 812 (e.g., the data store 732 of FIG. 7) such that data may be exchanged between the modules/engines and the data store 812.

In at least one embodiment, the automatic replenishment engine 800 includes the application programming interface 804. Generally, the application programming interface 804 may be utilized to receive and/or provide any suitable information to and/or from the automatic replenishment engine 800 (or modules of the automatic replenishment engine 800) with respect to any of the examples provided herein.

In the embodiment shown in the drawings, the association engine 806, a component of the automatic replenishment engine 800, may be configured to provide interface(s) for collecting user account information and/or association information related to an item (e.g., the item(s) 110 of FIG. 1) and an ARD (e.g., the ARD 106, 202, 302, 400 and/or 500 of FIGS. 1-5). The association engine 806 may be configured to store (e.g., within a user profile associated with a user) received user account information and/or association information collected from the provided interfaces. In some embodiments, the user profile may be stored within the data store 812 or at another suitable storage location accessible to the association engine 806.

In some embodiments, the input/output processing module 802 may be configured to provide a calculated fill level and/or current amount of an item that stored by the ARD. The calculated fill level/current amount may be presented via one or more interfaces provided by the input/output processing module 802 and/or the service provider computer(s) 108 and/or 701, and/or via a notification (e.g., email, text message, push notification etc.) provided by the input/output processing module 802.

In some embodiments, the sensor data management engine 808 may be configured to receive sensor data. The received sensor data may have been generated by one or more sensors of the ARDs 106, 202, 302, 400 and/or 500 of FIGS. 1-5. The received sensor data may include at least a distance measurement (e.g., quantifying a distance between the sensor and an item within the ARD) and/or a weight measurement (e.g., quantifying a weight of an item(s) placed on the ARD). The sensor data may further include accelerometer data and/or additional sensor data (e.g., image(s) captured at the ARD). The sensor data management engine 808 may be configured to calculate a fill level and/or or current amount of the item from the sensor data (e.g., a distance measurement, a weight measurement, an image, etc.). The calculated fill level/current amount may be provided to the input/output processing module 802 for rendering the information on a display of a user device. The calculated fill level/current amount may be provided to the ordering engine 810 for further processing.

The sensor data management engine 808 may be configured to determine from the sensor data that the sensor data is likely due to a user interaction. By way of example, the sensor data management engine 808 may utilized accelerometer data and/or images of the sensor data to determine that a change in the amount of the item at the ARD is likely due to a user interaction. This determination may be based on identifying that the accelerometer data indicates motion at the ARD that is commensurate with a user adding or removing some amount of the item. As another example, the determination may be based at least in part on identifying that an image taken at the ARD includes a person. In still further examples, the sensor data management engine 808 may be configured to compare accelerometer data to pre-determine pattern information to determine whether motion at the ARD may be due to an object falling on the ARD.

The ordering engine 810 may be configured to determine whether or not the calculated fill level/current amount is below a predetermined threshold (e.g., a replenishment threshold). If the current fill level/current amount is below the predetermined threshold, the ordering engine 810 may perform one or more operations to generate an automated order to reorder the item on behalf of the user. In some embodiments, the ordering engine 810 may stimulate the input/output processing module 802 to provide a notification to the user (e.g., via user device 106, via a website and/or application, via text messaging, email, etc.) that an order has been placed for the item. The user may elect to accept or reject the order via the notification, or by visiting a website hosted by an online retailer (e.g., a website hosted by the service provider computer(s) herein). If the user accepts the order, or does not respond within a given time period (e.g., 30 minutes), the automated order may proceed, resulting in the item eventually being delivered to the user. If the user rejects the order, the automated order may be deleted and no further processing may take place.

The input/output processing module 802 may be configured to provide notifications or presentations of the current fill level/current amount at any suitable time. The current fill level/current amount may be provided within an email, a text message, a push notification, an online retailer website, via an application, or the like. The input-output processing module 802 may further be configured to provide notification(s) that an object may have fallen on the object, that an automated order has been placed, or any suitable notification related to the examples provided herein.

Figure 9:
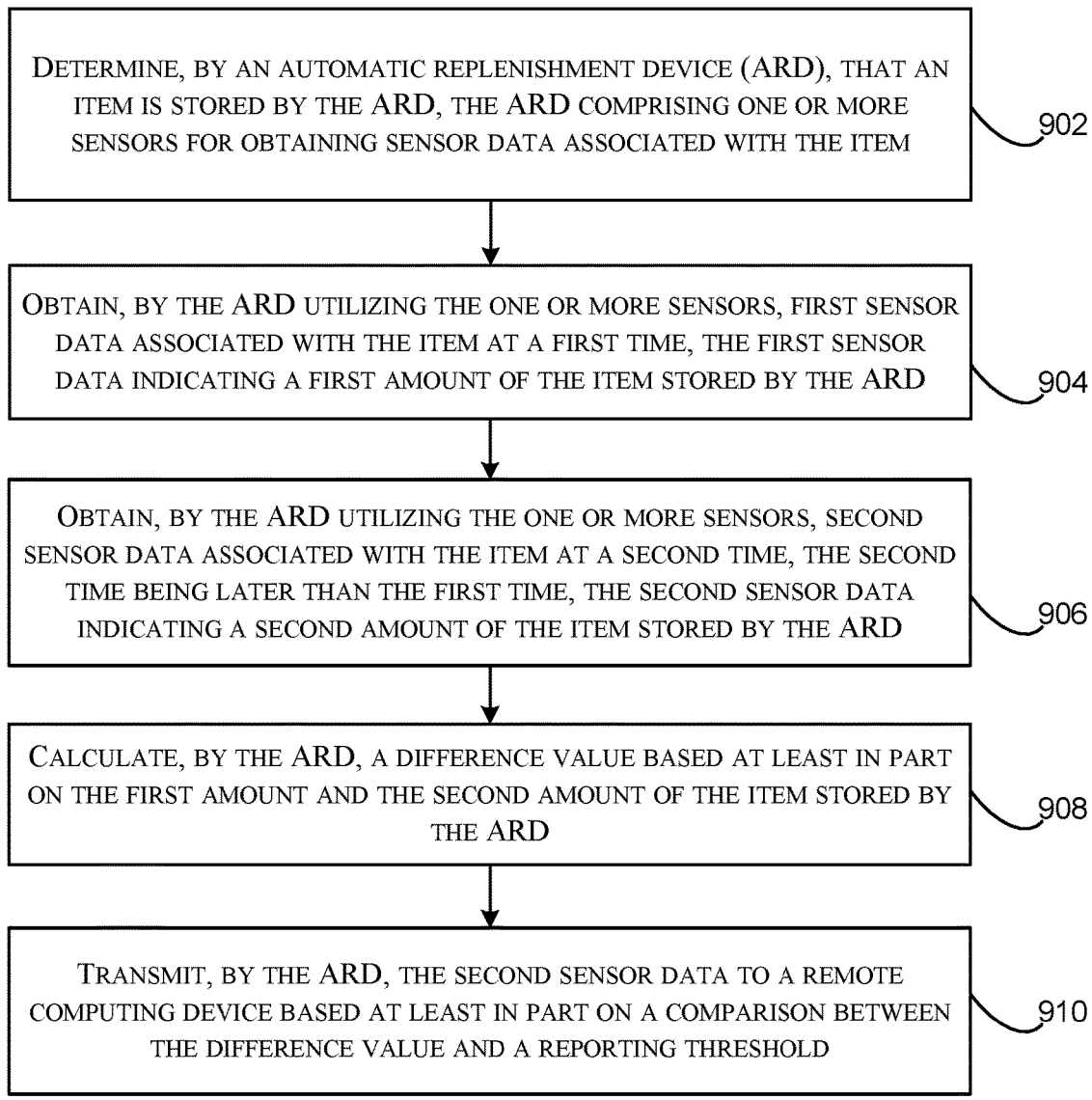
FIG. 9 illustrates a flow diagram of a method for conserving power at the ARD by optimizing reporting of sensor data, in accordance with at least one embodiment.

FIG. 9 illustrates a flow diagram of a method 900 for conserving power at an ARD by optimizing reporting of sensor data, in accordance with at least one embodiment. The method 900 may be performed by one or more components of the ARD 600. The method 900 may performed in any suitable order. It should be appreciated that the method 900 may include a greater number or a lesser number of steps than that depicted in FIG. 9.

The method may begin at 902, an automatic replenishment device (ARD) may determine that an item is stored by the ARD. For example, the one or more sensors of the ARD may sense the item and/or the item may be associated with the ARD via an association process initiated at the ARD and/or the user device 104 of FIG. 103. In some embodiments, the ARD comprising one or more sensors for obtaining sensor data associated with the item, e.g., the sensor(s) 116 of FIG. 1, 208 of FIGS. 2 and 3, 414 of FIG. 4, 510 of FIG. 5, and/or 615 of FIG. 6.

At 904, utilizing the one or more sensors, the ARD may obtain first sensor data associated with the item at a first time, the first sensor data indicating a first amount of the item stored by the ARD. In some embodiments, the first data may comprise initial sensor data obtained after the item was placed in/on the ARD (or in a storage associated with the ARD). As discussed above, the first sensor data may be obtained (e.g., by the data collection management module 613 of FIG. 6) according to a predetermined schedule, a timer, or the like.

At 906, the ARD utilize the one or more sensors to obtain second sensor data associated with the item at a second time. In some embodiments, the second time may be later than the first time. The second sensor data may indicate, among other things, that a second amount of the item stored by the ARD. As discussed above, the second sensor data may be obtained (e.g., by the data collection management module 613 of FIG. 6) according to a predetermined schedule, a timer, or the like.

At 908, the ARD may calculate a difference value based at least in part on the first amount and the second amount of the item stored by the ARD. By way of example, the ARD (e.g., the reporting module 614) may calculate a difference between sensor data that was previously obtained and most recently obtained sensor data. In some embodiments, the difference value may be expressed in raw values, units of weight and/or volume, or the like.

At 910, the ARD may transmit the second sensor data to a remote computing device based at least in part on a comparison between the difference value and a threshold value. For example, the threshold value may be a predetermined value and/or a percentage of an initial weight/amount of an item and/or a percentage of the weight/amount of the item as commercially packaged, etc. In some embodiments, if the difference value is equal to or greater than the threshold value, the transmission may occur. The threshold value may be used to differentiate relatively small fluctuations due to sensor drift from potential user interactions with the item stored by the ARD.

Figure 10:
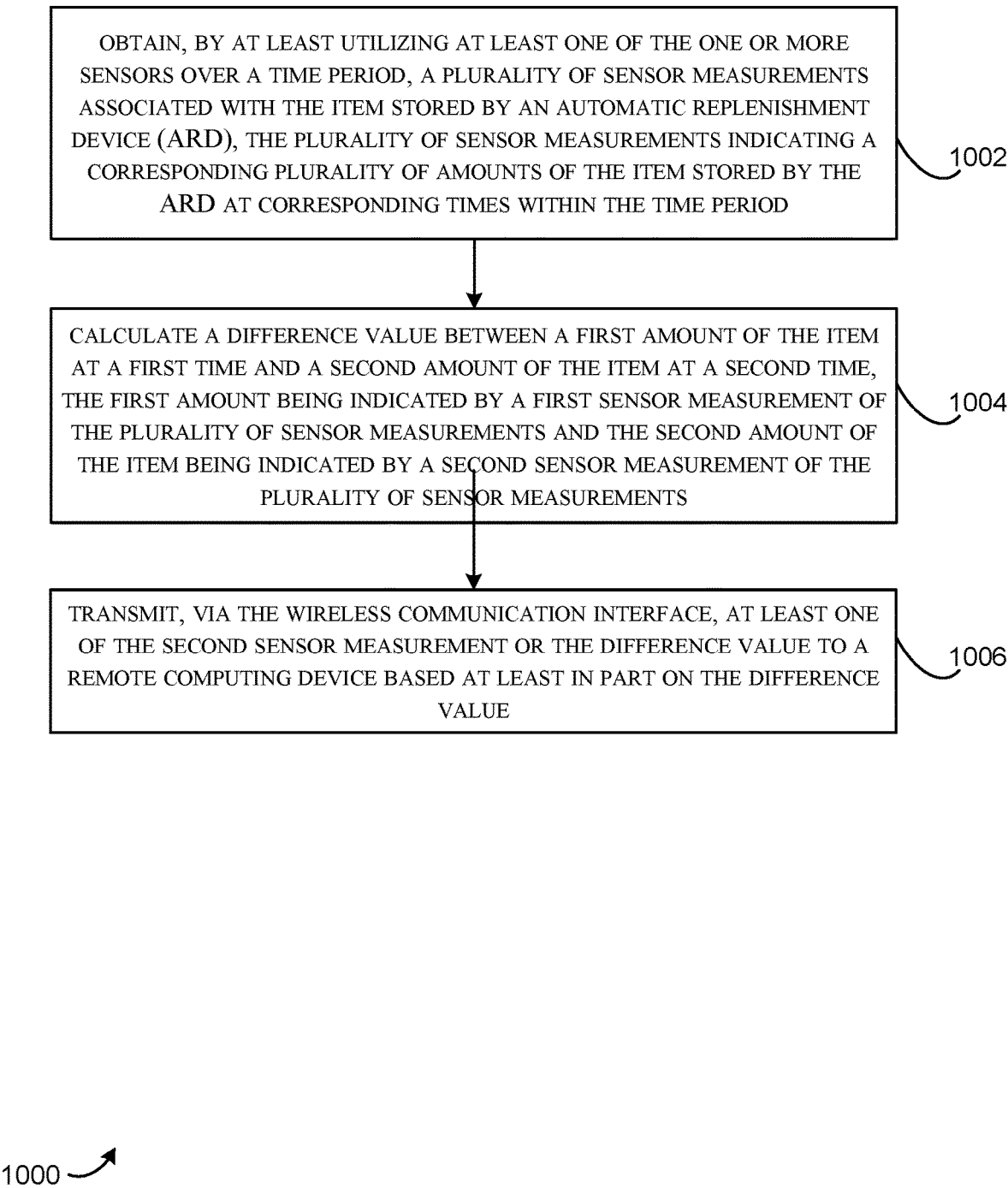
FIG. 10 illustrates a flow diagram of another method for conserving power at the ARD by optimizing reporting of sensor data, in accordance with at least one embodiment.

FIG. 10 illustrates a flow diagram of another method 1000 for conserving power at an ARD by optimizing reporting of sensor data, in accordance with at least one embodiment. The method 1000 may be performed by one or more components of the ARD 600. The method 1000 may performed in any suitable order. It should be appreciated that the method 1000 may include a greater number or a lesser number of steps than that depicted in FIG. 10. In some embodiments, the ARD may comprise a processor, one or more sensors configured to collect sensor measurements (e.g., sensor data) over a period of time, the sensor measurements being related to an item stored by the ARD, a wireless communication interface, and a memory that stores computer-readable instructions that, upon execution by the processor, configure the system to perform the method 1000. In some embodiments, a computer-readable storage medium may comprise computer-readable instructions that, upon execution by a computer system, configure the computer system to perform operations comprising the method 1000.

The method may begin at 1002, where at least one of the one or more sensors may be utilized (e.g., by the data collection management module 613 of FIG. 6) to obtain, over a time period, a plurality of sensor measurements associated with the item stored by the ARD. In at least one embodiment, the plurality of sensor measurements may indicate a corresponding plurality of amounts of the item stored by the ARD at corresponding times within the time period. The plurality of sensor measurements may be initiated and/or instructed by the data collection management module 613, for example, according to a predetermined schedule, a timer, and the like.

At 1004, a difference value between a first amount of the item at a first time and a second amount of the item at a second time may be calculated (e.g., by the reporting module 614 of FIG. 6). The first amount may be indicated by a first sensor measurement of the plurality of sensor measurements and the second amount of the item may be indicated by a second sensor measurement of the plurality of sensor measurements. The first sensor measurement and/or the second sensor measurement may be in any suitable format. The first amount and the second amount may be in the same format and/or units of the sensor measurements, or the first amount and the second amount may be converted from the sensor measurement into any suitable format/units (e.g., units of weight and/or volume).

At 1006, transmit, via the wireless communication interface, at least one of the second sensor measurement or the difference value may be transmitted (e.g., by the data communication module 612 of FIG. 6), via a wireless communication interface, to a remote computing device. In at least one embodiment, the transmission may be based at least in part on the difference value.

Figure 11:
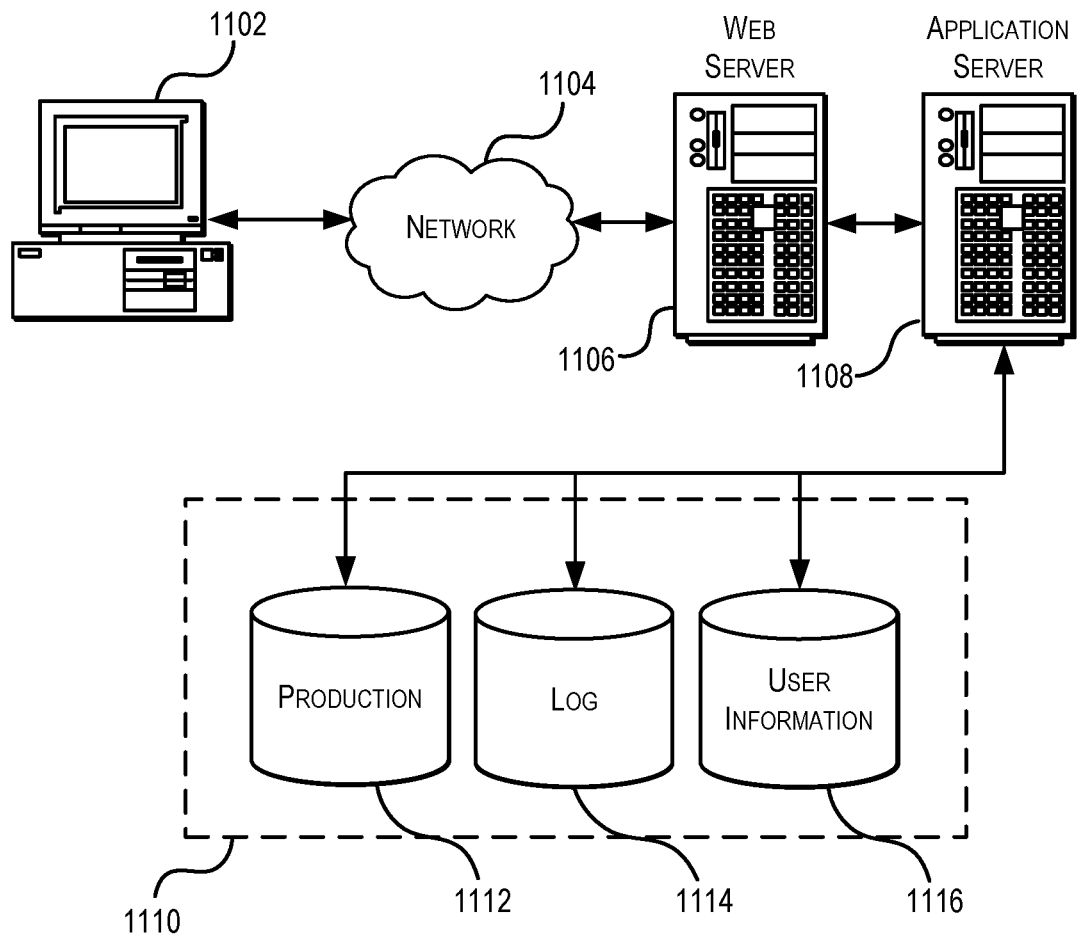
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 916, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, by an automatic replenishment device (ARD), that an item is stored by the ARD, the ARD being battery operated and comprising a sensor for obtaining sensor data associated with the item;
    obtaining, by the ARD utilizing the sensor, first sensor data associated with the item at a first time, the first sensor data being collected by the sensor and indicating a first amount of the item stored by the ARD;
    obtaining, by the ARD utilizing the sensor, second sensor data associated with the item at a second time, the second time being later than the first time, the second sensor data being collected by the sensor and indicating a second amount of the item stored by the ARD;
    calculating, by the ARD, a first difference value based at least in part on the first amount and the second amount of the item stored by the ARD;
    based at least in part on determining that the first difference value indicates a change in an amount of the item at the ARD and that the first difference value fails to exceed a reporting threshold;
    setting a timer;
    forgoing initialization of a wireless communication device of the ARD and transmission of the second sensor data, thereby preserving battery power and conserving processing resources of the ARD;
    on expiration of the timer, obtaining, by the ARD utilizing the sensor, third sensor data associated with the item at a third time, the third time being later than the second time, the third sensor data being collected by the sensor and indicating a third amount of the item stored by the ARD;
    calculating, by the ARD, a second difference value based at least in part on the third amount and the first amount of the item stored by the ARD;
    based at least in part on determining that the second difference value exceeds the reporting threshold, transmitting, by the ARD based on initializing the wireless communication device, the second sensor data to a remote computing device.

2. The computer-implemented method of claim 1, further comprising:
    obtaining, by the ARD utilizing the sensor, fourth sensor data associated with the item at a fourth time, the fourth time being later than the third time, the fourth sensor data indicating a fourth amount of the item stored by the ARD; and
    calculating, by the ARD, an additional difference value based at least in part on the third amount and the fourth amount of the item stored by the ARD, wherein the ARD forgoes transmitting the fourth sensor data to the remote computing device based at least in part on a comparison between the additional difference value and the reporting threshold.

3. The computer-implemented method of claim 1, further comprising obtaining an image by an image capture device, the image capture device being part of the automatic replenishment device, wherein transmitting the third sensor data or the second difference value is further based at least in part on determining that the image depicts a human being.

4. The computer-implemented method of claim 1, further comprising obtaining additional sensor data from an accelerometer of the ARD, the accelerometer being configured to measure motion, wherein transmitting the third sensor data or the second difference value is further based at least in part on the additional sensor data from the accelerometer.

5. The computer-implemented method of claim 1, further comprising:
    maintaining historical fluctuation amounts corresponding to a plurality of sensor fluctuations, at least one sensor fluctuation corresponding to the first sensor data and the second sensor data, the historical fluctuation amounts corresponding to only the past sensor fluctuations that have been determined to have occurred due to sensor drift;
    receiving, from the remote computing device, an expected amount of sensor drift, the expected amount of sensor drift being determined based at least in part on the historical fluctuation amounts; and
    modifying the reporting threshold to the expected amount of sensor drift.

6. The computer-implemented method of claim 1, further comprising:
    obtaining, by the ARD utilizing the sensor, fourth sensor data associated with the item at a fourth time, the fourth time being later than the third time, the fourth sensor data indicating a fourth amount of the item stored by the ARD; and calculating, by the ARD, an additional difference value based at least in part on the third amount and the fourth amount of the item stored by the ARD;

transmitting, by the ARD based on initializing the wireless communication device, the second sensor data to the remote computing device when the additional difference value indicates no sensor drift; and forgoing initialization of the wireless communication device and transmission of the second sensor data if the additional difference value indicates sensor drift, thereby preserving battery power and conserving processing resources of the ARD.

7. The computer-implemented method of claim 1, further comprising:

on expiration of the timer, obtaining, by the ARD utilizing the sensor, fourth sensor data associated with the item at a fourth time, the fourth time being later than the first time, the second time, and the third time, the fourth sensor data being collected by the sensor and indicating a fourth amount of the item stored by the ARD;

calculating, by the ARD, a third difference value based at least in part on the fourth amount and the first amount of the item stored by the ARD; and forgoing initialization of the wireless communication device and transmission of the fourth sensor data based at least in part on the third difference value, thereby preserving battery power and conserving processing resources of the ARD; and resetting the timer.

8. The computer-implemented method of claim 1, further comprising calculating the reporting threshold based at least in part on calculating a percentage of an initial item weight of the item at the ARD.

9. An automatic replenishment device (ARD) comprising:

a processor;

a sensor configured to collect sensor measurements over a period of time, the sensor measurements being related to an item stored by the ARD;

a wireless communication device; and a memory storing computer-readable instructions that, upon execution by the processor, configure the ARD to:

obtain, by at least utilizing the sensor over a time period using at least one timer, a plurality of sensor measurements associated with the item stored by the ARD, the plurality of sensor measurements indicating a corresponding plurality of amounts of the item stored by the ARD at corresponding times within the time period;

calculate a first difference value between a first amount of the item at a first time and a second amount of the item at a second time, the first amount being indicated by a first sensor measurement of the plurality of sensor measurements and the second amount of the item being indicated by a second sensor measurement of the plurality of sensor measurements;

based at least in part on determining that the first difference value indicates a change in an amount of the item at the ARD and that the first difference value fails to exceed a reporting threshold;

forgo initialization of the wireless communication device and transmission of plurality of sensor measurements, thereby preserving battery power and conserving processing resources of the ARD;

set a timer;

on expiration of the timer, obtain by the ARD utilizing the sensor, third sensor data associated with the item at a third time, the third sensor data being collected by the sensor and indicating a third amount of the item stored by the ARD;

calculate, by the ARD, a second difference value based at least in part on the third amount and the first amount of the item stored by the ARD; and based at least in part on determining that the second difference value exceeds the reporting threshold, transmit, based on initializing the wireless communication device to a remote computing device, the third sensor data.

10. The ARD of claim 9, wherein the ARD further comprises a thermal sensor configured to collect ambient temperature data associated with an area surrounding the ARD, and wherein a frequency at which the plurality of sensor measurements are obtained is based at least in part on the ambient temperature data.

11. The ARD of claim 9, wherein the computer-readable instructions, upon execution by the processor, further configure the ARD to:

determine, from a subset of the plurality of sensor measurements, an initial amount of the item stored by the ARD, wherein at least one of the plurality of sensor measurements is transmitted to the remote computing device further based at least in part on the reporting threshold, and wherein the reporting threshold is a predetermined percentage of the initial amount of the item.

12. The ARD of claim 11, wherein the sensor comprises a load cell configured to measure a weight of the item at the ARD or a time-of-flight sensor configured to measure a distance between the time-of-flight sensor and the item.

13. The ARD of claim 9, wherein transmitting the second sensor measurement to the remote computing device causes the remote computing device to:

determine that the third amount of the item is equal to or less than a reordering threshold amount; and cause an automated order for the item to be generated.

14. The ARD of claim 13, wherein the reordering threshold amount is specific to the ARD or the item.

15. The ARD of claim 9, wherein the computer-readable instructions, upon execution by the processor, further configure the ARD to:

store a set of amounts of the item obtained from a subset of the plurality of sensor measurements;

determine an overall amount of change in the item based at least in part on the set of amounts stored; and transmit, via the wireless communication device of the ARD, at least one sensor measurement of the plurality of sensor measurements to the remote computing device based at least in part on the overall amount of change in the item.

16. The ARD of claim 9, wherein a frequency at which the plurality of sensor measurements are obtained is based at least in part on the corresponding plurality of amounts of the item stored by the ARD.

17. A non-transitory computer-readable storage medium comprising computer-readable instructions that, upon execution by a processor of an automatic replenishment device (ARD), configure the ARD to perform operations comprising:

obtaining, utilizing a sensor of the ARD over a time period using at least one timer, instances of output data associated with an item stored by the ARD, the ARD being battering operated and comprising the sensor for obtaining the instances of output data indicating a corresponding plurality of amounts of the item stored by the ARD at corresponding times within the time period;

calculating a first difference value between a first amount of the item indicated by first output data and a second amount of the item indicated by second output data;

based at least in part on determining that the first difference value indicates a change between the first amount and the second amount of the item fails to exceed a reporting threshold:

forgoing initialization of a wireless communication device of the ARD and transmission of the first output data and the second output data, thereby preserving battery power and conserving processing resources of the ARD;

setting a timer;

on expiration of the timer, obtaining, by the ARD utilizing the sensor, third output data indicating a third amount of the item;

calculate, by the ARD, a second difference value based at least in part on the third amount of the item and the first amount of the item; and based at least in part on determining that the second difference value exceeds the reporting threshold, transmitting, by the ARD based on initializing the wireless communication device, at least one of the third output data or the second difference value.

18. The non-transitory computer-readable storage medium of claim 17, wherein the computer-readable instructions, upon execution by the processor of the ARD, further configure the ARD to perform operations comprising:

maintaining a historical record of fluctuation amounts corresponding to a past sensor fluctuation indicated by at least one instance of output data, the historical record of fluctuation amounts comprising only past sensor fluctuations that have been determined to have occurred independent from user interaction with the item; and modifying the reporting threshold used for transmission based at least in part on the historical record of fluctuating amounts comprising only the past sensor fluctuations that have been determined to have occurred independent from user interaction with the item.

19. The non-transitory computer-readable storage medium of claim 17, wherein the computer-readable instructions, upon execution by the processor of the ARD, further configure the ARD to perform operations comprising:

determining that at least one instance of output data occurred as a result of random sensor fluctuation rather than user interaction with the item;

calculating an expected fluctuation amount of the sensor based at least in part on the at least one instance of output data; and modifying the reporting threshold used for transmission based at least in part on the expected fluctuation amount.

20. The non-transitory computer-readable storage medium of claim 17, wherein the ARD further comprises an image capture device and an accelerometer that is configured to measure motion, and wherein the computer-readable instructions, upon execution by the processor of the ARD, further configure the ARD to perform operations comprising:

obtaining an image by the image capture device of the ARD; and obtaining additional sensor data from the accelerometer of the ARD, wherein determining that the transmitting the third output data or the second difference value is further based at least in part on at least one of the image or the additional sensor data from the accelerometer.

* * * * *